(12) United States Patent
Hamid et al.

(10) Patent No.: US 11,900,299 B2
(45) Date of Patent: Feb. 13, 2024

(54) SYSTEM AND METHOD OF TRACKING INTERACTIONS WITH A NETWORKED COLLABORATION PLATFORM

(71) Applicants: Atlassian Pty Ltd., Sydney (AU); Atlassian Inc., San Francisco, CA (US)

(72) Inventors: Shihab Hassan Hamid, Sydney (AU); Addo Wondo, Sydney (AU); Geoff Sims, Sydney (AU); Hao Ye, Sunnyvale, CA (US); Gaurav Awadhwal, Sydney (AU); Penyo Atanasov, Sydney (AU); Ahmed Saad, Sydney (AU); Simon Hugo Robilliard, Sydney (AU); Alexander McCarthy, Sydney (AU); Sreeraj Arakkal, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 107 days.

(21) Appl. No.: 16/914,424

(22) Filed: Jun. 28, 2020

(65) Prior Publication Data
US 2021/0406804 A1    Dec. 30, 2021

(51) Int. Cl.
G06Q 10/0639      (2023.01)
G06Q 10/10        (2023.01)

(52) U.S. Cl.
CPC ..... *G06Q 10/06398* (2013.01); *G06Q 10/103* (2013.01)

(58) Field of Classification Search
CPC ... G06Q 10/063112; G06Q 10/063118; G06Q 10/06398; G06Q 10/103; G06F 16/9538; G06F 16/285

USPC .......................................... 705/7.42; 715/739
See application file for complete search history.

(56) References Cited

U.S. PATENT DOCUMENTS

| | | | | |
|---|---|---|---|---|
| 7,882,439 | B2* | 2/2011 | Elman | H04L 41/18 |
| | | | | 715/740 |
| 10,515,096 | B1* | 12/2019 | Choudhary | G06F 3/04847 |
| 2015/0046436 | A1* | 2/2015 | Li | G06Q 30/02 |
| | | | | 707/723 |
| 2015/0220882 | A1* | 8/2015 | Flores | G06Q 10/103 |
| | | | | 705/301 |

(Continued)

OTHER PUBLICATIONS

Konstan, Joseph A., and John Riedl. "Recommender systems: from algorithms to user experience." User Modeling and User-Adapted Interaction 22.1-2 (2012): 101. (Year: 2012).*

*Primary Examiner* — Charles Guiliano
*Assistant Examiner* — Letoria G Knight
(74) *Attorney, Agent, or Firm* — Brownstein Hyatt Farber Schreck, LLP

(57) ABSTRACT

A collaboration platform for implicitly determining user collaborations in real time or near real time is disclosed. The collaboration platform monitors event records generated based on user interactions with various team-based tools/collaborative applications to generate collaboration scores that provide a real time picture of a user's interactions with other users, and a user's interactions with content/objects/projects in the tools/collaborative applications. The collaboration platform also monitors user interactions with specific sub-projects to determine at any given time the users actively involved in any given project or sub-project.

17 Claims, 10 Drawing Sheets

(56) References Cited

U.S. PATENT DOCUMENTS

| | | | |
|---|---|---|---|
| 2016/0132198 A1* | 5/2016 | Sinclair | G06Q 50/01 |
| | | | 715/739 |
| 2016/0171090 A1* | 6/2016 | Schwartz | G06F 16/35 |
| | | | 707/730 |
| 2016/0344678 A1* | 11/2016 | MacDonald | G06Q 10/103 |
| 2018/0115603 A1* | 4/2018 | Hu | G06Q 50/01 |
| 2018/0189693 A1* | 7/2018 | Newhouse | G06Q 10/0631 |
| 2018/0225359 A1* | 8/2018 | Gadamsetty | H04L 67/306 |
| 2018/0365627 A1* | 12/2018 | Mansour | G06Q 10/06393 |
| 2020/0110786 A1* | 4/2020 | Kim | G06Q 10/10 |
| 2021/0216937 A1* | 7/2021 | Dhaygude | G06N 5/04 |

\* cited by examiner

CLOUD PLATFORM PRODUCTS

Powering Atlassian cloud platform products since 2005

Team Members — 802

- John Doe
- Jim Beam
- Alice C
- Eve N
- Johnny W
- Kim B
- Rohan K

Worked on:
- Search & Smarts Q3 FY20 OKRs
- What's new in Teamwork Platform
- Scalable downstream dependencies Links
- Latest Cloud Platform PM team org!
- Cloud Platform PM space

Search results

🔍 Requests|

PAGES, BLOGS AND ATTACHMENTS

New Laptop Request – process and system specs
PUG> ITSupport | Updated Aug 25, 2019

Change Management Process
PUG>IT Support | Updated Aug 25, 2019

Troubleshooting Articles
Hello> Sales Ops | Updated Aug 25, 2019

Beyond Gravity Finance Report
PUG> IT Operations | Updated Aug 25, 2019

GLIFFY

Feature request workflow diagram
Hello> Facilities Workplace Support | Updated Aug 25, 2019

TEAM CALENDARS

Leave requests
PUG> IT Support | Updated Sep 1, 2019

SPACES

Travel & Relocation Support

Filter options

Spaces

☑ IT Support ②

☐ Sales Ops ①

☐ IT Operations ①

More Spaces

Contributors

☑ Johnny W

☐ Kim B

☑ Rohan K

More users

SYSTEM AND METHOD OF TRACKING INTERACTIONS WITH A NETWORKED COLLABORATION PLATFORM

TECHNICAL FIELD

Aspects of the present disclosure are directed to collaborative computer applications and in particular to creation of collaboration data and/or utilization of collaboration data in collaborative computer applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Traditional working environments may include multiple users working on a range of projects and teams. Individual users may generate content and other work product in accordance with their organizational team. However, the contributions of individuals may be limited to the immediate teams and projects to which they have been assigned. As described herein, a networked collaboration platform may be used to monitor user interactions and suggest new connections between users based on user-to-user feature sets, collaboration scores, a ranking of user identifiers, and other computed metrics.

SUMMARY

Example embodiments described herein are directed to a computer-implemented method of tracking user activity using a networked collaboration platform. A user-collaborator request is received at a first client device including a user identifier of a user making the user-collaborator request and a user identifier of a target user. A user-to-user feature set is determined based on the user identifier of the target user. The user-to-user feature set includes counts of the number of times the target user interacts with other users using the networked collaboration platform. Collaboration scores are computed for each of the other users the target user interacts with based on the user-to-user feature set. User identifiers associated with the other users are ranked based on the collaboration scores and selecting a predefined number of ranked user identifiers. The selected user identifiers are forwarded to a second client device for display in a user interface rendered on the second client device.

Some example embodiments are directed to a computer-implemented method including various operations including: receiving a container-user request from a client device, the container-user request comprising an identifier of a container and an identifier of a requesting user; retrieving container-to-user feature set based on the identifier of the container, wherein the container-to-user feature set includes counts of the number of times users interact with the container; identifying user identifiers of distinct users based on the container-to-user feature set; computing collaboration scores for each identified user identifier based on the container-to-user feature set; ranking the user identifiers based on the computed collaboration scores and selecting a predefined number of user identifiers having highest collaboration scores; and forwarding the selected user identifiers to the client device for display in a user interface rendered on the client device.

BRIEF DESCRIPTION OF THE DRAWINGS

In the drawings:

FIG. 8 is a screenshot illustrating an example project landing page powered by collaboration information according to some embodiments of the present disclosure.

FIG. 10 is an example search interface according to some embodiments of the present disclosure.

Figure 1:
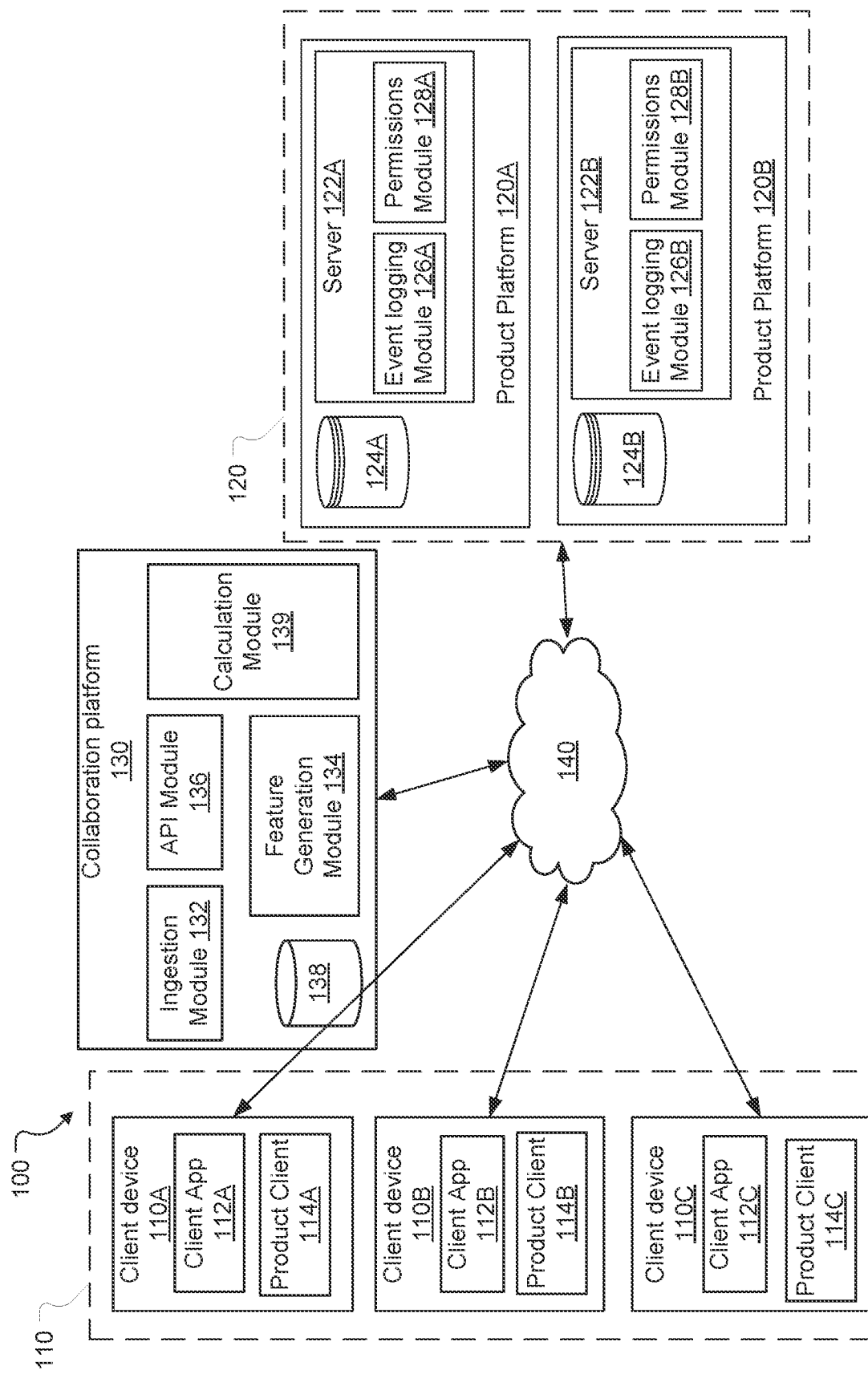
FIG. 1 is a block diagram of a networked environment according to some embodiments of the present disclosure.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Organizations these days are more flexibly structured than they were two or three decades ago. Hierarchies are vanishing and in large technological organizations employees from different teams and groups often come together to work on projects and then go back to their original team-based tasks once the project is completed. Further, in organizations that run multiple such cross-team projects it is difficult to keep track of the employees currently working on a given project and/or employees a particular employee is interacting with at any given time. Further still, sometimes, a third user might identify a new project that the third user might wish to contribute to, but it is difficult for the third user to know who to approach.

Accordingly, in large technologically driven organizations, it is desirable to know the latest projects a user is working on, the latest people a user is commonly interacting with and/or the latest users working on a given project without having to manually track movements of people in an organization.

Accordingly, it may be desirable to know how users are collaborating within an organization to be able to understand for example the latest projects a user is working on, the latest people a user is interacting with and/or the latest users working on a given project without having to manually track movements of people in an organization. Although this might be doable manually in small organizations that have a limited number of teams or a limited number of active projects at any given time, it becomes very difficult if not impossible to keep a track of employees in large multinational organizations that have thousands or tens of thousands of employees, hundreds of teams and thousands of active projects at any given time.

Further, organizations typically employ a number of team-based tools/computer applications that help users collaborate. These applications typically provide a number of features to help aid in collaboration but may still include some default unintelligent features that do not take a user's collaboration context into consideration when providing these features or controls to users.

To address one or more of these issues, embodiments of the present disclosure provide a collaboration platform for implicitly determining user collaborations within any given organization in real time or near real time. The collaboration platform monitors how users interact with various team-based tools/collaborative applications available in an organization to generate a real time picture of a user's interactions with other users, and a user's interactions with content/objects/projects in the tools/collaborative applications. The collaboration platform also monitors user interactions with specific sub-projects to determine at any given time the users actively involved in any given project or sub-project.

To do this, the collaboration platform generates one or more collaboration features based on raw interaction data received from the various tools/collaborative applications available in the organization. The raw interaction data may be created each time a user performs one or more predefined functions/operations on the collaborative applications. These collaboration features can be queried to obtain smart inferential information about users and/or active projects in an organization. Further, the individual features can be combined in intelligent ways to respond to specific queries and/or provide intelligent and accurate recommendations. The term "collaboration feature" as used herein refers to an individual measurable property or characteristic of collaboration.

In this manner, the collaboration platform can provide a real picture of how employees in an organization are collaborating and with whom at any given time. In some embodiments, the collaboration platform can be used to power smart capabilities and heuristic-driven inferences. For instance, the collaboration features generated by the collaboration platform can be utilized to power search engines in the team-based tools/collaborative applications to unearth more relevant search results for a user (e.g., based on projects the user requesting the search works in, and/or the people the user requesting the search usually collaborates with). Similarly, in cases where users are typically inundated with notifications from multiple computer applications/people in a given work day, the collaboration features generated by the collaboration platform can be used to highlight more relevant updates (e.g., notifications associated with projects a user currently works or from people the user currently actively collaborates with).

In some other cases, the collaboration platform can recommend users to connect with on other collaborative applications utilized by the organization. For instance, if a user installs a new instant messaging application (e.g., Slack), the collaboration platform can be used to power recommendations for adding contacts in the instant messaging application that are already registered on the instant messaging application and collaborate with the user frequently on the other collaborative tools in the organization. Similarly, if the instant messaging application has channels corresponding to the projects active in the organization, the collaboration platform 130 can be used to power channel recommendations to the user based on the projects that user works on in other collaborative tools already used by the organization. In this manner, interactions monitored on one collaborative application can be used to power recommendations on another collaborative application.

In some other cases, the features generated by the collaboration platform may be utilized by the team-based tools/collaborative applications to improve their user interfaces—e.g., by providing intelligent/heuristic driven picker controls in their user interfaces (e.g., by providing picking recommendations for a user picker control based on the users a given user often collaborates with or providing a project picker control based on the projects a user has lately been working on, etc.).

These and other aspects of the present disclosure will be described in detail with reference to FIGS. 1-10 below.

FIG. 1 illustrates an environment 100 in which one or more aspects of the present disclosure are implemented. Specifically, FIG. 1 illustrates the systems involved in creating, maintaining and using collaboration features. The systems include client devices (e.g., client devices 110A, 110B, and 110C, collectively referred to as client devices 110), product platforms (e.g., product platforms 120A and 120B, collectively referred to as product platforms 120), and a collaboration platform 130. The client devices 110, product platforms 120, and collaboration platform 130 communicate with each other over one or more communication networks 140.

Generally speaking, users of client devices 110 are associated with a user account and generate electronic activity. This activity includes any type of user account interaction with the product platforms 120, including interactions with content and/or software applications hosted by the product platform 120. Example interactions include exchanging emails and/or documents, editing content, commenting on content, visiting web pages, sharing, liking, or viewing content, communicating with other user accounts in a real-time chat interface, etc. The collaboration platform 130 (in communication with the product platforms 120) monitors this user account activity to generate collaboration features and respond to queries regarding collaboration data for a particular user account or project.

The client device 110 may be any suitable device, for example a mobile device (e.g. a tablet or mobile phone), a portable device (such as laptop computer), or any other computing device (e.g. a desktop computer).

As illustrated in FIG. 1, each client device 110 includes one or more client (software) applications (e.g., client applications 112A, 112B, and 112C) that are configured to access collaboration features made available by the collaboration platform 130. The client applications 112 include instructions and data stored in the memory (e.g. non-transient compute readable media) of the client devices 110 on which the applications are installed/run. These instructions are executed by a processor of the client device 110 to perform various functions as described herein. By way of example, some functions performed by the client application 112 include communicating with the collaboration platform 130, rendering a user interface presenting the collaboration information (e.g., collaboration information about a user account, collaboration information related to a particular piece of content, and/or collaboration information related to a particular project) based on instructions received from the collaboration platform 130, receiving inputs from user accounts and communicating these inputs to the collaboration platform 130.

In addition to client applications 112 that access collaboration information, the client devices 110 may further include one or more product clients 114 configured to access software applications made available by the product platforms 120. In this case, the clients 114 may communicate with applications hosted by the product platforms 120, render user interfaces based on instructions received from those applications, and receive inputs from user accounts allowing them to interact with the applications hosted by the product platforms 120.

The client applications 112 and 114 may be implemented in various ways. For example, the client applications 112 or 114 may be web browser applications (such as, for example, Chrome, Safari, Internet Explorer, Opera) which access the applications hosted by the product platforms 120 and/or the collaboration platform 130 via appropriate uniform resource locators (URL) and communicate with these systems via general world-wide-web protocols (e.g. HTTP, HTTPS, FTP). In this case, the web browser application is configured to request, render and display user interfaces that conform to a markup language such as HTML, XML or extensions, and may be capable of internally executing browser-executable code such as JAVASCRIPT, or other forms of code. Alternatively, the client applications may be specific applications programmed to communicate with the product platforms 120 and/or the collaboration platform 130 using defined application programming interface (API) calls.

In general, a product platform 120 is a system entity that hosts one or more software applications and/or content. The product platform 120 may include one or more servers 122 for hosting corresponding software application(s) and one or more databases 124 for storing application specific data. Examples of software applications hosted by the product platform 120 include collaborative applications (e.g., Confluence), software code management applications (e.g., Bitbucket), and issue tracking applications (e.g., JIRA). Jira, Confluence, and BitBucket are all offered by Atlassian, Inc. It will be appreciated that the software applications need not be offered by the same organization and that the presently disclosed embodiments can be used with any product platform configured to interact with the collaboration platform 130.

In order to run a particular application, the server 122 includes one or more application programs, libraries, APIs, or other software elements that implement the features and functions of the application. In one example the product server 122 includes an event logging module 126 which monitors user account interactions with the product applications hosted by the server 122 and records these user account interactions as an event log. The event logging module 126 may be configured to communicate the event logs to the collaboration platform 130 either as a continuous stream or in batches periodically. The product server 122 may also include a permissions module 128, which is configured to manage permissions to access content and the product applications hosted by the server 122. In particular, the permissions module 128 may be configured to receive a query to determine whether a user account has access to a particular resource and respond to that query based on the permission data stored and managed by the permissions module 128. Functions of the event logging module 126 and the permissions module 128 will be described in detail with respect to FIGS. 2-10 disclosed herein.

The product platform 120 also stores product data. Product data generally includes: data defining the operation of the hosted application (for example, user accounts, user permissions, and the like); and application data (i.e., the content hosted/maintained by the application, which can be, for example, issue data (in Jira), page/document data (in Confluence), source code data (in BitBucket), etc.). The data is stored on and managed by database 124. Database 124 is provided by a database server which may be hosted by server 122, but is more typically hosted on a separate physical computer in communication (directly or indirectly via one or more networks) with the server 122.

While single server architecture has been described herein, it will be appreciated that the product platform 120 can be implemented using alternative architectures. For example, in certain cases a clustered architecture may be used where multiple server computing instances (or nodes) are instantiated to meet system demand Conversely, in the case of small enterprises with relatively simple requirements a product platform 120 may be a stand-alone implementation (i.e., a single computer directly accessed/used by the end user).

The collaboration platform 130 as described previously is configured to create and manage collaboration features and respond to queries regarding collaboration data. To that end, the collaboration platform 130 includes an ingestion module 132 configured to receive event log data from the one or more product platforms 120, a feature generation module 134 configured to convert the ingested event log data into feature data, a feature database 138 for storing the feature data, and an application programming interface (API) module 136 configured to receive one or more collaboration queries and respond to these queries. The API module 136 may include multiple APIs The collaboration platform 130 also includes a computation module 139 configured to analyze the feature data, compute scores, and generate results to respond to the queries received via the API module 136.

As illustrated in FIG. 1, communications between the client devices 110, product platforms 120, and collaboration platform 130 are via the communications network 140. For example, the client devices 110 may communicate with the product platforms 120 and collaboration platform 130 through a local area network (LAN) or a public network (e.g., the Internet). Furthermore, the product platforms 120 may communicate with the collaboration platform 130 over open web protocols such as (HTTPS, REST, and JWT).

It will be appreciated that although three client devices (110A, 110B and 110C) and two product platforms 120 have been illustrated, in normal operation, many more client devices 110 and product platforms 120 may be connected to the collaboration platform 130 through the network 140.

Further, although the event logging module 126 and the permissions module 128 are illustrated as part of the product platforms 120, in some embodiments, the event logging module 126 and/or the permissions module 128 may be separate entities.

For instance, in some cases, the event logging module 126 may be an independent event platform (not shown) that is designed based on a publish-subscribe model. That is, product platforms 120 send event data to the event platform and consumers (such as the collaboration platform 130) subscribe to the event platform to receive certain type of event data from the event platform. In this model, the publishers categorize the event data into classes without knowledge of which subscribers there may be. Similarly, subscribers express interest in one or more classes of event data and receive event data from the event platform that is of interest to them. When the event platform receives an event log, the event platform matches the event log with the subscribers who are subscribed to the event and makes a copy of the event data for each subscriber and stores a copy of the subscriber's queue or stream. In this case, the product platforms 120 may submit event data to the event platform and the collaboration platform 130 may subscribe to the event platform to receive data event related to any user account interaction with applications running on the product platform 120. StreamHub offered by Atlassian is one example of such an event platform.

Similarly, the permissions module 128 may be an independent access management platform (not shown) that receives permissions data from the product platforms 120 and acts as a source of permission data for the product platforms 120. This way, if any system needs permission information for any user account in the network 100 the system can directly query the access management platform to determine if the user account has permission to access a resource instead of checking with the individual product platforms. Further, if a given system requires permission information for a particular user but related to multiple resources available on different product platforms, the system does not need to query product platforms 120 individually to receive this information. Instead, this information can be obtained with a single query to the access management platform. To this end, the access management platform may maintain a database of permissions associated with individual resources available on the product platforms 120.

Further still, in some embodiments, the network 100 may further include an identity platform (not shown). Typically, in organizations, employees are identifier by unique user identifiers. These might be the same as the user identifiers used by the employees for accessing the product platforms 120 or may be different from those identifiers. An identity platform manages and links the various user identifiers used by product platforms 120 in the network to the user identifiers used by the organization. This way identity can be federated across the platform. Further the identity platform may maintain personal user information for employees that is shared with the various product platforms—e.g., the user name, position, organization division, years employed by the organization, date of birth, etc. The collaboration platform may query the identity platform from time to time to retrieve personal user information for user identifiers.

The operations/techniques described herein are implemented by one or more special-purpose computing systems or devices. For example, in environment 100: the collaboration platform 130 may be provided by one or more computer systems; each client device 110 is a computer system; and each of the product servers 122 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 2:
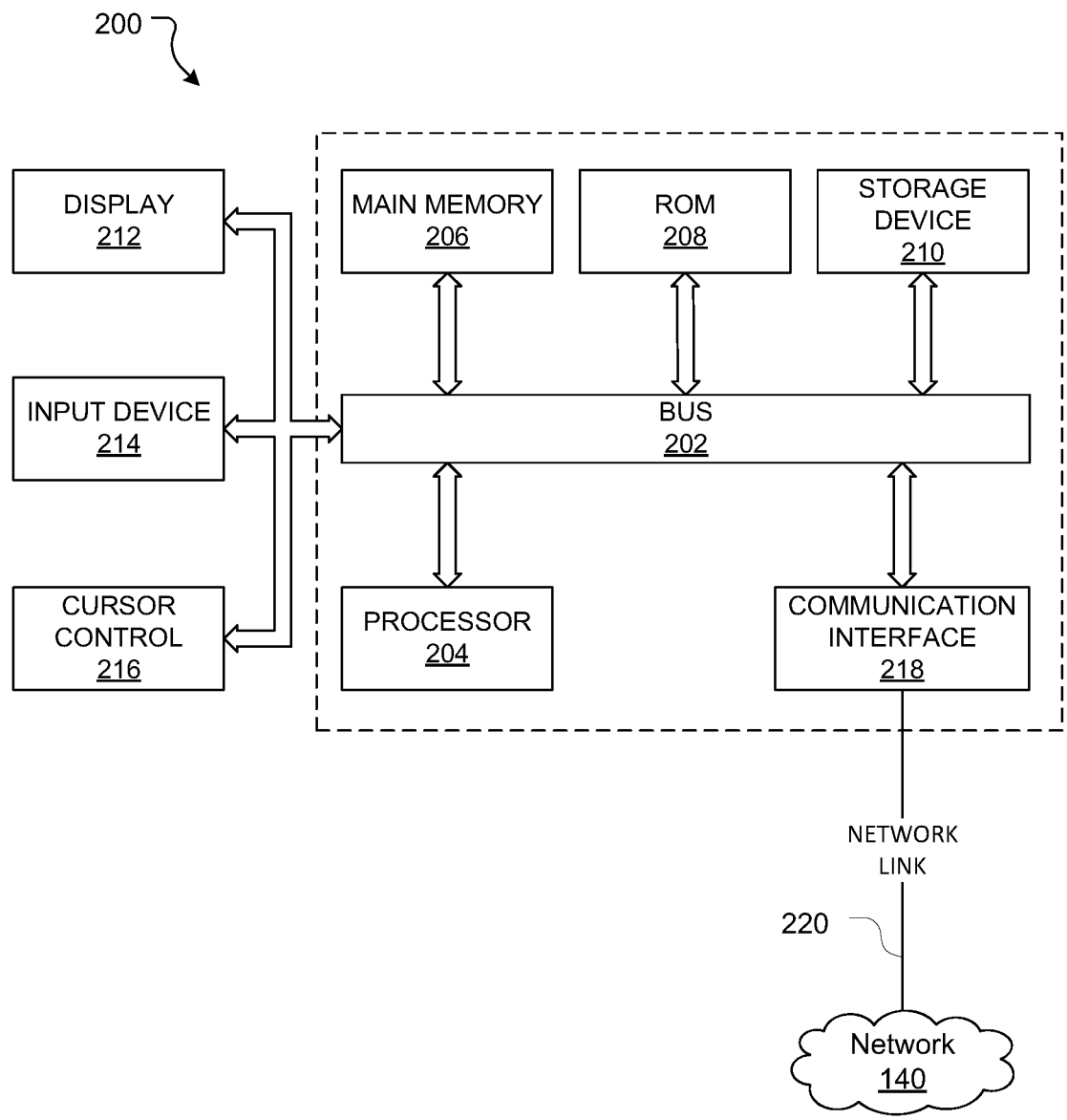
FIG. 2 is a block diagram of a computing system with which various embodiments of the present disclosure may be implemented.

For example, FIG. 2 is a block diagram that illustrates a computer system 200 upon which an embodiment of the present disclosure may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. If the computer system 200 is part of the collaboration platform 130, the storage device 210 may store feature database 138.

In case the computer system 200 is the client device 110, it may be coupled via bus 202 to one more output devices such as a display 212 for displaying information to a computer user. Display 212 may, for example, be a cathode ray tube (CRT), a liquid crystal display (LCD), a light emitting diode (LED display), or a touch screen display. An input device 214, including alphanumeric and other keys, may be coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to network 140. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks 140 to other computing systems. For example, if the computer system 200 is part of the collaboration platform 130, the network link 220 may provide a connection through network 140 to client devices 110 or product platforms 120.

Computer system 200 can send messages and receive data, including program code, through the network(s), network link 220 and communication interface 218. In the collaboration platform example, the ingestion module 132 may receive event data through the network 140 and communication interface 218 from the product platform 120A or the event platform.

The processor 204 of the product server 122 may execute the received event data as it is received, and/or store it in storage device 210, or other non-volatile storage for later execution.

The following section describes data structures employed by the collaboration platform 130 to generate and store collaboration features. The data structures and fields described are provided by way of example. Depending on the implementation, additional, fewer, or alternative fields may be used. Further, the fields described in respect of a given data structure may be stored in one or more alternative data structures (e.g. across multiple linked data structures). Further, although tables are used to illustrate the data structures, the relevant fields/information may be stored in any appropriate format/structure.

As noted previously, users (on their client devices 110 and through an associated user account) interact with content and/or applications hosted by one or more product platforms 120. When a user account interacts with a product platform 120 an event is generated. As referred to herein, an event is an interaction between a user account and content/applications hosted by product platforms 120. Examples of events include, without limitation: posting messages in an interactive chat application (e.g., Slack), a social media application, a forum, or a blog; liking, sharing, mentioning, or responding to posts; creating, editing, commenting on pages in a wild (e.g., Atlassian Confluence), creating, assigning, approving issues in an issue tracking system (e.g., Jira), committing source code, approving pull requests, creating pull requests, etc., in an SCM system (e.g., Bitbucket), etc. This list of example events is non-exhaustive and any other type of interactions with the product platforms (e.g., opening a page, raising an incident ticket in an issue tracking application such as Jira) can also be considered within the scope of the term "event".

When an event is detected, the product platform 120 on which the event occurs generates information in respect of the event (in the form of an event record) and forwards this to the event module/platform. The event module/platform then checks the event record to determine if the collaboration platform 130 has subscribed to any of the information present in the event log. If the event module/platform determines that the collaboration platform 130 has subscribed to information in the event log, the event module/platform streams the requested data (in case the collaboration platform 130 has requested event data to be streamed to the collaboration platform 130 as soon as it is received at the event platform) or stores the requested data in a queue (in case the collaboration platform 130 periodically queries the event platform for batches of event data) for the collaboration platform 130.

In some embodiments, the collaboration platform 130 may request the following information for user account interaction events detected by the product platform and received at the event platform—

User identifier—this is the unique user account identifier of the user that interacted with a product platform that generated the event, Product platform identifier—this is a unique identifier of the product platform on which the event was recorded—e.g., Jira, Confluence, Bitbucket.

Object identifier—the thing that the user interacted with on the product platform 120 is referred to as an "object" in this disclosure. The object may be a page in Confluence, an issue in Jira, a repo in BitBucket, etc. The object identifier is the unique identifier of the object the user interacted with when the event was generated.

Container identifier—this is the unique identifier of any hierarchical parent of the object. For example, in the case of Confluence, the parent of a page object may be a space and in the case of Jira, the parent of an issue object may be a project or a story or an epic.

Timestamp—this indicates the date/time the event occurred.

Permissions—this field indicates whether the object has the same set of permissions as the parent or not. In case the object has the same set of permissions as the parent, this field may be set to TRUE. Otherwise, it may be set to FALSE.

Event type indicator—this field indicates the type of activity the user was performing when the event occurred. Examples include, e.g., creating an object, editing an object, mentioning another user account in an object, commenting on an object, etc.

Mentioned user account (optional)—if the event corresponds to a user account mentioning another user account in an object, user account identifiers of the one or more user accounts mentioned during the event.

In some embodiments, the collaboration platform 130 may subscribe to all user interaction event records. In other embodiments, the collaboration platform 130 may subscribe to a specific types of interaction events. The type of interaction events requested depends on the types of recommendation the collaboration platform is configured to make. For example, if the collaboration platform is configured to recommend or rank a list of users a particular user collaborates with, the collaboration platform 130 may subscribe to all user-to-user interactions such as mentions, co-commenting, co-editing, co-creating, etc. In another example, if the collaboration platform is configured to determine affinity/indifference between users, the collaboration platform may subscribe to interaction events such as when users like, dislike, share content and/or use emojis in content.

Once the ingestion module 132 receives the event data (either via a batched pull or a streaming push) from the event modules/platform that it has subscribed to, the collaboration platform 130 utilizes the event data from the received event records to populate one or more features.

It will be appreciated that a number of implicit conclusions can be drawn from event data. For example, if a user, Bob, edits a number of Confluence pages in a given Confluence Space frequently, it can be concluded that Bob works on the page associated with that Confluence Space. As Bob's frequency of editing Confluence pages in that Space dwindles and ends, it can be concluded that Bob no longer works on the associated project. Similarly, if it is found that Bob and Alice frequently co-edit the same Confluence pages, it can be concluded that Bob and Alice often collaborate with each other. In a similar vein, for a given project, if the event records indicate that Bob, Alice and John typically create, edit or comment on objects in the space associated with that project, it can be concluded that Bob, Alice and John work on the given project. To make these types of implicit determinations, the collaboration platform 130 maintains a number of collaboration features.

As used in this disclosure, the term collaboration feature refers to a measured property or characteristic of a particular type of collaboration. Typically, a collaboration feature records counts of the number of times users perform a particular type of collaboration. For example, a user-to-user feature records a count of the number of times users interact with other users, a user-to-container feature records a count of the number of times users interact with objects or containers, and a container-to-user feature records a count of the number of times objects or containers are interacted with.

Collaboration features can be combined in multiple different ways to answer specific collaboration questions or provide specific recommendations—e.g., which projects does a particular user work in, who does a particular user collaboration with, who works in a particular team/project, etc. Depending on the implementation and the types of collaboration answers/recommendations a collaboration platform 130 is configured to provide, it can select the types of interaction events it is interested in and slice/dice these event records in different ways to create collaboration features based on which meaningful insights can be determined.

In certain embodiments, the collaboration platform 130 maintains different feature sets for different product platforms. Accordingly, if two product platforms 120 are connected to the collaboration platform 130 it may maintain two feature sets—one for each platform. Further, the collaboration platform 130 maintains different feature sets based on the type of collaboration—e.g., one feature set related to user-to-user interactions, one feature set related to user-to-container interactions, and one feature set related to container-to-user interactions. Further still, the collaboration platform 130 can maintain different features within these feature sets for different types of interaction events it has subscribed to—e.g., it may maintain one feature based on an object editing event type, another feature based on events where a user account mentions another user account, another feature based on events where a user account comments on an object, and yet another feature based on object creation events.

In some embodiments, the event data may also be sliced and diced based on the date and time of the events such that different features are created based on events that fall within certain time windows—e.g., last 7 days, 14 days, 30 days, 60 days, 90 days, etc.

As described previously, the number and types of features maintained by the collaboration platform 130 will depend on the types of questions the collaboration platform 130 is configured to answer. For example, if the collaboration platform is configured to answer the question, "who does user A work with", the collaboration platform 130 may maintain features related to user-to-user interactions. Alternatively, if the collaboration platform 130 is configured to answer the question, "who did user A work with in the last week and in the last 90 days", it may maintain features related to user-to-user interactions that are further segmented based on different time windows.

In a preferred embodiment, the collaboration platform 130 maintains a user-to-user feature set, a user-to-container feature set, and a container-to-user feature set. For these feature sets, it also maintains features based on event type—e.g., in the user-to-user feature set, it maintains, a co-edit feature (indicating the number of times two users have co-edited an object), a co-comment feature (indicating the number of times two users have co-commented on an object), and a mentions feature (indicating the number of times a user has mentioned another user in an object). Further still, these features may be further divided into time windows, such that each event based feature includes a 14 day feature, a 30 day feature, and a 90 day feature. Similar types of features may be present in the user-to-container feature set and in the container-to-user feature set.

Examples of these feature sets are described below.

As used in this disclosure, a container refers to an object's parent. For example, in Confluence, a container may refer to a space (which can include multiple pages) and in Jira, a container refers to a project (which can include multiple issues).

Table A illustrates an example 14 day container create feature. This feature is calculated for individual users and shows the number of times a user creates an object in a container (e.g., a space/project) in the last 14 days. This feature is calculated based on the create event data. From any given create event record, the feature generation module 134 retrieves the user identifier of the user that created an object and the container identifier of the object the user created.

TABLE A

| 14 day container create feature | | | |
|---|---|---|---|
| Collab ID | User ID | Container ID | Count |
| 2352 | dd155f790a4b09f8 | 3874 | 5 |
| 2353 | 2d16eb3587c36ebb | 3748 | 2 |
| 2354 | 7e304fb010115d40 | 2813 | 7 |
| 2355 | bdda8f8c35c2d858 | 8974 | 3 |
| ... | | ... | ... |

In the example data structure, for each record, the following information is stored:
The collaboration identifier uniquely identifying the pair of user and container.
  User ID—the unique identifier of the user that created an object in the container
  Container ID—the unique identifier of the container the object belongs to
  Count—a count of the number of times the user has created objects in the corresponding container in the last 14 days.

Similar data structures may be maintained for 30 day and 90 day create features for other product platforms 120 associated with the collaboration platform 130.

Table B illustrates an example 14 day container edit feature. This feature is calculated for individual users and shows the number of times a user edits an object in a container (e.g., a space/project) in the last 14 days. This feature is calculated based on the edit event data. From any given edit event record, the feature generation module retrieves the user identifier of the user that edited an object and the container identifier of the object the user edited.

TABLE B

| 14 day container edit feature | | | |
|---|---|---|---|
| Collab ID | User ID | Container ID | Count |
| 2352 | dd155f790a4b09f8 | 3874 | 12 |
| 2353 | 2d16eb3587c36ebb | 3748 | 18 |
| 2354 | 7e304fb010115d40 | 2813 | 5 |
| 2355 | bdda8f8c35c2d858 | 8974 | 3 |
| ... | | ... | ... |

In the example data structure, for each record, the following information is stored:
The collaboration identifier uniquely identifying the pair of user and container.
  User ID—the unique identifier of the user that edited an object in the container
  Container ID—the unique identifier of the container of which the object is part
  Count—the count of the number of times the user has edited objects in the corresponding container in the last 14 days.

Similar data structures may be maintained for 30 day and 90 day edit features for other product platforms 120 associated with the collaboration platform 130.

Table C illustrates an example 14 day container comment feature. This feature is calculated for individual users and shows the number of times a user comments on an object in a container (e.g., a space/project) in the last 14 days. This feature is calculated based on the comment event data. From any given comment event record, the feature generation module 134 retrieves the user identifier of the user that commented in an object and the container identifier of that object.

TABLE C

| 14 day container comment feature | | | |
|---|---|---|---|
| Collab ID | User ID | Container ID | Count |
| 2352 | dd155f790a4b09f8 | 3874 | 2 |
| 2353 | 2d16eb3587c36ebb | 3748 | 1 |
| 2354 | 7e304fb010115d40 | 2813 | 5 |
| 2355 | bdda8f8c35c2d858 | 8974 | 8 |
| ... | | ... | ... |

In the example data structure, for each record, the following information is stored:
The collaboration identifier uniquely identifying the pair of user and container.
  User ID—the unique identifier of the user that made a comment in an object in the container
  Container ID—the unique identifier of the container to which the object belongs
  Count—the count of the number of times the user has commented in objects in the corresponding container in the last 14 days.

Similar data structures may be maintained for 30 day and 90 day comment features for each product platform 120 associated with the collaboration platform 130.

From the user-to-container features, for a given user, a list of the containers the user has interacted with can be obtained along with a list of the number of times the user has interacted with each container. Based on this data, the collaboration platform can determine the top containers (and associated projects) a user collaborated in in a given time frame.

Table D illustrates an example 14 day user edit feature. This feature is calculated for containers and shows the users and the number of times users have edited objects in containers (e.g., a space/project) in the last 14 days. This feature is also calculated based on the edit event data and is similar to the container edit feature described above. From any given edit event record, the feature generation module retrieves the user identifier of the user that edited an object and the container identifier of the object the user edited.

TABLE D

| 14 day user edit feature | | | |
|---|---|---|---|
| Collab ID | Container ID | User ID | Count |
| 2352 | 3874 | dd155f790a4b09f8 | 12 |
| 2353 | 3748 | 2d16eb3587c36ebb | 18 |
| 2354 | 2813 | 7e304fb010115d40 | 5 |
| 2355 | 8974 | bdda8f8c35c2d858 | 3 |
| ... | ... | | ... |

In the example data structure, for each record, the following information is stored:
The collaboration identifier uniquely identifying the container and user pair.

Container ID—the unique identifier of the container of which the object is part

User ID—the unique identifier of the user that edited an object in the container Count—the count of the number of times an object in the container has been edited by the user in the last 14 days.

Table E illustrates an example 14 day user comment feature. This feature is calculated for each container and shows the number of times a user comments on an object in a container (e.g., a space/project) in the last 14 days. This feature is calculated based on the comment event data. From any given comment event record, the feature generation module retrieves the user identifier of the user that commented in an object and the container identifier of that object.

TABLE E 14 day user comment feature

| Collab ID | Container ID | User ID | Count |
|---|---|---|---|
| 2352 | 3874 | dd155f790a4b09f8 | 2 |
| 2353 | 3748 | 2d16eb3587c36ebb | 1 |
| 2354 | 2813 | 7e304fb010115d40 | 5 |
| 2355 | 8974 | bdda8f8c35c2d858 | 8 |
| ... | ... | ... | ... |

In the example data structure, for each record, the following information is stored:

The collaboration identifier uniquely identifying the pair of container and user.

Container ID—the unique identifier of the container to which the object belongs user ID—the unique identifier of the user that made a comment in an object in the container Count—a count of the number of times objects within the container have been commented on by the user in the last 14 days.

Similar data structures may be maintained for 30 day and 90 day comment features for each product platform 120 associated with the collaboration platform 130.

From the container-to-user features, for a given container, a list of the users that have interacted with the container can be obtained along with a list of the number of times each the user has interacted with each container. Based on this data, the collaboration platform can determine the top users that are associated with any given container (and associated project) in a given time frame.

The user-to-container/object and container/object-to-user features can be directly generated based on received events. However, user-to-user features are slightly more difficult to compute. Aside from events where a user mentions another user or a user assigns an issue to another user, there are few events that show direct user-to-user interaction. The user-to-user feature set captures relationships between users by joining individual creating/updating/mentioning/commenting events together through a common entity—such as an object or a container. For example, the users who edited a given page/issue can be considered to have direct user-to-user interaction.

In one example, the user-to-user interaction feature set may include, for each product platform, different types of event type based use-to-user features and different types of time-window based features. Table F illustrates an example 14-day co-edit feature. This feature is calculated for every user and shows the number of times pairs of users have co-edited objects in a particular product platform in the last 14 days.

TABLE F 14 day co-edit feature

| Collab ID | User A ID | User B ID | Count |
|---|---|---|---|
| 2352 | dd155f790a4b09f8 | a60cbb92d049d43f | 56 |
| 2353 | 2d16eb3587c36ebb | 0e88ad13569bc1a7 | 40 |
| 2354 | 7e304fb010115d40 | 239fe457a6c97748 | 45 |
| 2355 | bdda8f8c35c2d858 | e21812980c8eafb7 | 34 |
| ... | ... | ... | ... |

In the example event data structure, for each unique event record, the following information is stored:

The collaboration identifier uniquely identifies the pair of users A and B. In one example, the collaboration identifier may be a simple combination of the user identifiers of the two user accounts it represents.

User A ID—the unique identifier of the first user in the pair

User B ID—the unique identifier of the second user in the pair

Count—the count of the total number of times users A and B have coedited objects.

Typically, the co-edit feature is computed based on the user-to-container and container-to-user edit features. For example, for a given user, the feature generation module 134 retrieves the user-to-container edit features over the 14 day period to identify the containers the user has edited and retrieves a count of a number of times the given user has edited the given containers. Then, the feature generation module 134 performs a lookup in the 14-day container-to-user editing feature to retrieve a list of the other users that have edited the given container along with their corresponding edit counts. The feature calculation module 145 then forms pairs between the given user and the other users retrieved from the 14-day container-to-user edit feature and either identifies these pairs in table F (if they already exist) or adds a record for the pair in table F (if the record doesn't exist). For each user pair, the system subsequently determines the number of times each user in that pair has edited a container and selects the lower editing count as the count for that user pair for that container. For example, if the given user has edited a given container 12 times and user A has edited the container 2 times, the editing count for that user pair for that container is considered two. If the lower editing count is for the given user, the user-to-user count in Table F is incremented. Otherwise, the record count is not updated. This process is repeated for the user pair for any other containers the pair have edited in the 14 day period.

Table F shows a total count of user-to-user edit interactions in containers. Therefore, the feature generation module computes the number of times a given pair of users have edited containers. It is also possible to maintain this feature per container. In that case, each record in table F also includes a container identifier and the feature count indicates the number of times a pair of users have edited a given container in the 14 day period.

Table G illustrates an example 14 day co-comment feature. This feature is also calculated for every user and shows the number of times pairs of users have co-commented on objects on a given product platform in the last 14 days.

TABLE G 14 day co-comment feature

| Collab ID | User A ID | User B ID | Count |
|---|---|---|---|
| 2352 | dd155f790a4b09f8 | a60cbb92d049d43f | 12 |
| 2353 | 2d16eb3587c36ebb | 0e88ad13569bc1a7 | 18 |
| 2354 | 7e304fb010115d40 | 239fe457a6c97748 | 5 |
| 2355 | bdda8f8c35c2d858 | e21812980c8eafb7 | 3 |
| ... | ... | ... | ... |

In the example data structure, for each record, the following information is stored:

The collaboration identifier uniquely identifying the pair of users A and B.

User A ID—the unique identifier of the first user in the pair

User B ID—the unique identifier of the second user in the pair

Count—the count of the number of times users A and B have co-commented on an object.

Typically, the co-comment feature is computed based on the user-to-container and container-to-user comment features. For example, for a given user, the feature generation module 134 retrieves the user-to-container comment features over the 14 day period to identify the containers the user has commented in and retrieve a count of a number of times the given user has commented in the given containers. Then, a lookup is performed in the 14-day container-to-user comment feature to retrieve a list of the other users that have commented in the given containers along with their corresponding comment counts. The system then forms pairs between the given user and the other users retrieved from the 14-day container-to-user comment feature and either identifies these pairs in table G (if they already exist) or adds a record for the pair in table G (if the record doesn't exist). Then, for each user pair, the system determines the number of times each user in that pair has commented in each container and selects the lower commenting count as the commenting count for that user pair for that container. For example, if the given user has commented in the container 12 times and user A has edited the container 22 times, the commenting count for that user pair is considered 12. If the lower editing count is for the given user, the user-to-user count in Table G is incremented. Otherwise, the record count is not updated. This process is repeated for the user pair for any other containers the pair have commented in the 14 day period.

Table G shows a total count of user-to-user comment interactions in containers. Therefore, the feature generation module computes the number of times a given pair of users have commented in containers. It is also possible to maintain this feature per container. In that case, each record in table G also includes a container identifier and the feature count indicates the number of times a pair of users have commented in a given container in the 14 day period.

Table H illustrates an example data structure for a 14 day mention feature. This feature is also calculated for every user and shows the number of times a user mentions another user in the last 14 days. This feature is calculated based on the mention event data. From any given mention event record, the feature generation module 134 retrieves the user identifier of the user that generated the mention event (i.e., the mentioner) and the user identifier of the user mentioned by mentioner (i.e., the mentionee).

TABLE H 14 day co-mention feature

| Collab ID | Mentioner ID | Mentionee ID | Count |
|---|---|---|---|
| 2352 | dd155f790a4b09f8 | a60cbb92d049d43f | 12 |
| 2353 | 2d16eb3587c36ebb | 0e88ad13569bc1a7 | 18 |
| 2354 | 7e304fb010115d40 | 239fe457a6c97748 | 5 |
| 2355 | bdda8f8c35c2d858 | e21812980c8eafb7 | 3 |
| ... | ... | ... | ... |

In the example data structure, for each record, the following information is stored:

The collaboration identifier uniquely identifying the pair of mentioner and mentionee.

Mentioner ID—the unique identifier of the mentioning user

Mentionee ID—the unique identifier of the mentioned user in the pair

Count—the count of the number of times the mentioner has mentioned the mentionee in the last 14 days.

Typically, when calculating the co-mention feature, the feature generation module 134 retrieves the mention event records created in a given time duration. For each mention event record, the feature generation module 134 retrieves the user identifiers of the mentioner and the mentionee(s), creates collaboration identifiers for the pairs of mentioner with each of the mentionees and checks whether any of the collaboration identifiers already exist in Table H. If the collaboration identifier exists in the table, the corresponding count is increased by one. Alternatively, if any of the collaboration identifiers are not found in the table, a new record is created in the table for that pair of users and the count is recorded as 1. Next time the feature calculation module 145 encounters that pair of mentioner and mentionee again, it does not create a new record, instead the count of the existing record is incremented by 1.

This feature shows the total count of mentions between a mentioner and mentionee pair. In some embodiments, the feature generation module 134 also calculates user-to-user mention features per container and user-to-user mention features per object. In these cases, the data-structure may include an additional container identifier or object identifier column such that counts reflect the number of times a user has mentioned another user in a given container or a given object.

Similar data structures may be maintained for 30 day and 90 day user-to-user features for each product platform 120 associated with the collaboration platform 130.

From the user-to-user features, for a given user, a list of users that the user interacted with (e.g., edited objects with, commented on objects with, or mentioned) can be obtained along with a list of the number of times the corresponding user account interacted with each such user account. Based on this data, the collaboration platform 130 can determine the top user accounts a given user collaborated with in a given time frame.

The collaboration platform 130 maintains separate features in each of the feature sets because the collaboration types they correspond to indicate different degrees of interaction/collaboration. For instance, co-editing a document with another user strongly indicates that the two users are collaborating, whereas one user commenting on the same page as another user may not always indicate collaboration. A user from a different team could simply be viewing a page and make a comment which another user may respond to, but neither of those users may regularly collaborate with each other. Similarly, mentioning a user may not necessarily indicate that the two users collaborate often. For example, while working on a project, Bob may mention that he had heard that Alice (from a different team) had previously solved a similar problem, but this does not necessarily indicate that Bob and Alice work together. Similarly, creating or editing objects in a container may strongly indicate that the users are affiliated with the corresponding containers, but commenting on objects in a container may not indicate affiliation strongly. Therefore, when determining whether user A collaborates with user B, these features may be given different significance. In case the collaboration platform 130 is configured to treat each of these collaboration types equally, a single user-to-user, user-to-container, and container-to-users feature may be maintained that each include count of different types of interactions between users or between users and containers (without any differentiation).

Similarly, the collaboration platform maintains the 14 day, 30 day and 90 day features because they offer different degrees of confidence. For example, if user A has started interacting with user B in the last 7 days, the collaboration platform 130 cannot confidently conclude that these users collaborate with each other often as it does not have enough historical data to make this prediction. Alternatively, if user A has interacted with user B constantly over the last 90 days, the collaboration platform 130 can more confidently conclude that these users collaboration with each other often. In case the collaboration platform 130 is configured to treat recent and historical collaborations equally, it may maintain a single time duration for the feature sets (without any differentiation).

Up until this point, the features that are described have not taken any permissions or privacy into consideration. When a particular user requests collaboration information about himself/herself, privacy is not an issue. However, when a user requests collaboration information about another user, privacy becomes an issue.

For example, consider two users, Alice and Bob, working together on a private object called "secret page" in a public/open container called "open space". Also consider that Alice does not usually work on any public objects in the open space container. In this case, if Alice mentions Bob a lot in this private object in the last few days but not on any other public objects in this container, Alice's user-to-user feature will probably have the largest number of counts of interaction with Bob. Similarly, if Alice is not working on any other projects at the moment, her user-to-container features will also probably have the largest number of counts for the "Open Space" container. If a user Eve requests the collaboration platform 130 to provide a list of the top people Alice works with and the top containers Alice works in, Bob and "Open space" will probably be the first few results in the respective lists, respectively. However, Eve does not have access to the "secret page" object. Accordingly, in this case, showing Bob as the top person who works with Alice is showing private information to Eve that she should not be privy to, given she is not permitted to see the "secret page" object where Alice and Bob work together. Moreover, showing "Open space" as the top container in which Alice works is showing private information to Eve as Alice doesn't usually work on any public objects in the "Open Space" container and Eve does not have access to the "Secret Page" object and should not know anything about it.

Given this privacy issue when a user (third party) requests collaboration information about another user (first party), the collaboration platform 130 has to apply certain restrictions to the features. In one embodiment, features illustrated in Tables A-H can be updated to include permissions metadata. However, even if permissions metadata was stored for these features, computing permissions for all features for all user combinations would be extremely computationally expensive.

Accordingly, in some aspects, a different set of features are maintained for responding to third party queries. In this case, the collaboration platform 130 maintains a third party user-to-container feature set and a third party container-to-user feature set, but does not maintain any third party user-to-user feature set. Further, the third party user-to-container feature set and the container-to-user feature set, although similar to the feature sets described with reference to tables A-H above, are restricted or based on fewer events. In particular, any event records that correspond to objects that have different permissions to the corresponding container are discarded when updating features in the third party feature sets. Accordingly, the features computed/generated for the third party feature sets are based on event records associated with objects that have the same permissions as the parent container.

As noted, additional or fewer data structures to those shown above may be used in implementing the embodiments described herein. For example, while no "likes" based features are described above, in some embodiments, this event type may also be taken into considered when generating features.

Various methods and processes for creating/updating collaboration features and for using these collaboration features to respond to queries from external systems will now be described. In particular, FIG. 3 illustrates an example process for creating and updating collaboration features, whereas FIGS. 5-7 and 9 illustrate example processes for responding to queries for collaboration information.

Figure 3:
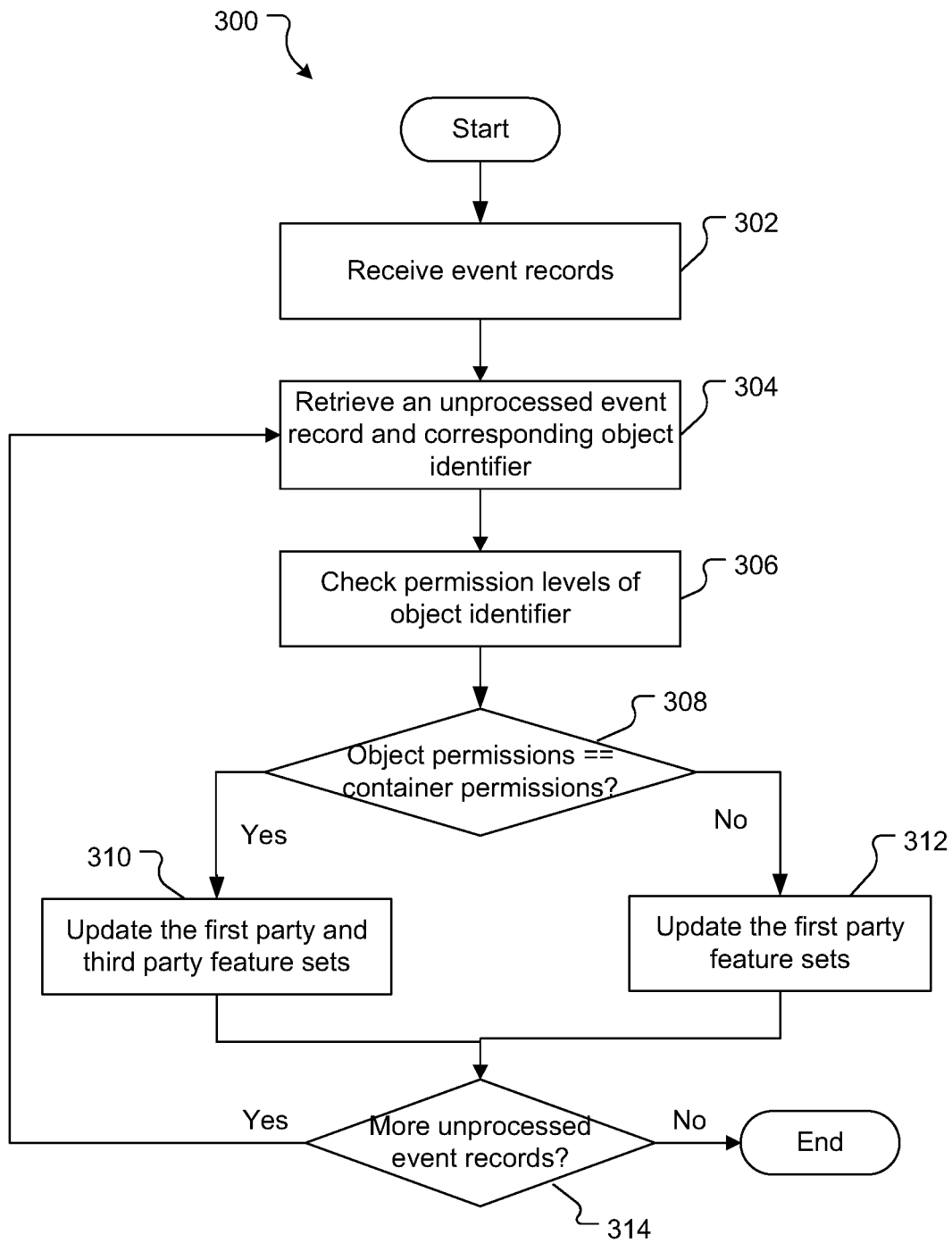
FIG. 3 is a flowchart illustrating a method for creating/updating features according to some embodiments of the present disclosure.

FIG. 3 illustrates an example method 300 for creating/updating collaboration features. Although method 300 is described with reference to a single calculation process for a single feature, it will be appreciated that in practice this method is repeated periodically to calculate the collaboration features maintained by the collaboration platform 130 in a given period. Further, in this example method 300, it is assumed that the collaboration platform 130 maintains a first party collaboration feature set and a third party collaboration feature set.

The periodicity of method 300 depends on the manner in which the collaboration platform is configured. For example, in some cases the collaboration platform 130 may be configured to recompute the collaboration features every hour and in other cases the collaboration platform 130 may be configured to recompute the collaboration features every day. The selected recomputing frequency may depend on a number of factors such as computation power required for the computing, the available computation power of the collaboration platform 130, etc.

The method begins at step 302, where comment event records corresponding to a particular time window W (e.g., last 7 days, last 14 days, last 30 days, last 90 days, etc.) are received at the collaboration platform 130 and particularly at the ingestion module 132. In certain embodiments, based on a current time T, the feature generation module 134 retrieves events that occurred between the period T-W.

In certain embodiments, the product platforms 120 (and in particular the event logging modules 126) or the event platform push event records to the ingestion module 132 either in real time (i.e., whenever an event occurs) or at predetermined intervals (e.g., every 15 minutes, every hour, etc.). In case event records are pushed at predetermined intervals, the ingestion module 132 receives a batch of event records for events that were generated during that interval and stores these event records until it is time to compute the features.

In other embodiments, the ingestion module 132 may pull event records from the event logging modules 126 or event platform in real time (e.g., by utilizing webhooks (programmed into the software applications and tools hosted by the product platforms 120 or event platform) that notify the collaboration platform 130 when events occur at the product platforms 120 or are available at the event platform) or by requesting the product platforms 120 or event platform at predetermined intervals (e.g., every minute, every 5 minutes, etc.) to provide event records that were generated in that interval. The ingestion module 132 stores these event records until it is time to compute the features.

In any case, for the received event records, the collaboration platform 130 receives relevant data in respect of the event which may, depending on the implementation, include metadata and/or content. In one example, the event record may include the data fields described previously.

At step 304, an unprocessed event record from the set of event records for that time window is selected.

At step 306, the object identifier associated with that unprocessed event record is retrieved from the event record and the feature generation module 134 checks the permission level associated with the object identifier. In certain embodiments, this permission information may be received as part of the event record. In other embodiments, this might not be the case.

Certain product platforms 120 (e.g., Jira and Confluence) fire transactional/indexing events when an object is modified. These events include the security level of the object. If the security level of the object is the same as the container, the value of this field is typically NULL. Alternatively, if the security level of the object is different from the container, a non-NULL value is provided. Accordingly, in some embodiments, the collaboration platform 130 may also subscribe to these transactional/indexing events and maintain a database for received object identifiers as part of these transactional events along with their permission level—e.g., 0 if same permissions as container or 1 if different permissions to the parent. As permissions of objects may change over time, the collaboration platform 130 checks the security level of the objects each time a new transactional event is received. If the object is already recorded in the permission database, the stored permission level is compared with the newly received security level of the object. If there is no change, the database remains unaffected. But, if there is a change in the permission level, the record in the permission database is updated.

As these transactional events are generated when the object is updated, the collaboration platform 130 may not have the permission levels for all the objects maintained by the product platforms. Accordingly, in one example, the feature generation module 134 may first perform a lookup of the object identifiers in the permissions database stored by the collaboration platform 130. If no matches are found in the permissions database, it may query the corresponding product platform 120 for the permission level of the corresponding objects.

In any event, once the permission levels for the object is checked, at step 306, the feature generation module 134 determines whether the permission level of the object is the same as that of its associated container (e.g., if the security level field of the object is NULL or a non-NULL value) at step 308.

If the permission level of the object is determined to be the same as that of its associated container (yes path from step 308), the method proceeds to step 310, where the feature generation module 134 updates the first party and third party feature sets maintained in the feature database 138 based on the event record. For instance, the feature generation module 134 updates tables A-H described above for the first party feature set and similar user-to-container feature tables and container-to-user feature tables for the third party feature set. It will be appreciated that not all features can be updated based on an event record. For example, if the event record is an edit event record, the edit features are updated. Similarly, if the event record is a comment event record, the comment features are updated.

As described previously, if the feature generation module 134 determines that a collaboration records already exists in any of the tables A-H and corresponding third party feature tables, it updates the count of the corresponding collaboration record. Alternatively, if the feature generation module 134 determines that a collaboration record does not already exist in any of the tables A-H and corresponding third party feature tables, it adds a new record to the table with a count of 1. As a user-to-user feature set is not maintained by the third party features, no user-to-user feature set update is done for the third party feature set.

Alternatively, if, at step 308, the feature generation module 134 determines that the permission level of the object is not the same as the permissions of the container (no path from step 308), the method proceeds to step 312 where the feature generation module 134 updates the first party feature sets and does not update any third party feature sets. The first party feature sets may be updated in a similar manner as described with respect to step 310.

At step 314, the feature generation module 134 determines whether any unprocessed event records exist in the event records retrieved at step 302. If it is determined that one or more unprocessed event records exist, the method returns to step 304. Alternatively, if a determination is made that no unprocessed event records remain, the method 300 ends.

As the collaboration features described above store feature data for a given duration, they also maintain timestamps of when the features are computed/recomputed. Once process 300 is completed for a given time window, feature records maintained in the corresponding features that corresponds to events older than the given duration for that feature are removed from the features such that at any given time, these features show the count of interactions that occurred in the duration associated with the collaboration feature. For example, if a feature maintains counts of a collaboration type for a 14 day period and the periodicity of process 300 is 6 hours, at the end of process 300, feature counts that correspond to the first 6 hours of the 14 day period are subtracted from the total feature count such that a rolling 14 day feature count is maintained.

Accordingly, using method 300, the collaboration platform 130 creates and maintains a database 138 of feature data. This database 138 is updated periodically based on the selected re-computation frequency. Furthermore, information stored in this database 138 is subsequently analyzed to respond to a number of queries. These functions will be described in detail in the following sections.

In certain embodiments, the collaboration platform 130 may construct a collaboration graph from the underlying feature data, where the nodes of the graph represent users and/or containers and the edges between nodes represent the relationships between the nodes (based on the feature data). Furthermore, edges may be weighted such that thicker edges represent higher collaboration counts between a user account and another user account or a container (e.g., because the user account mentioned the other user account many times in the recent past or edited objects in the container frequently in the recent past—measured via the count of collaborations in the various first party and/or third party feature sets) whereas thinner edges represent low interaction between a user account and a theme (e.g., because the user account mentioned the other user account or container very few times over a period). Further still, in case weighting factors are used, the edges may also be weighted based on weighting factors associated with the types of collaborations such that the edge between a user account and a container is thicker when a user account creates or edits an object and thinner when a user account comments in an object. Similarly, the edge between two user accounts may be thicker when the user accounts co-edit objects together and may be thinner when the user accounts co-comment in the same objects and even thinner when one user account mentions the other user account.

As described previously, the collaboration platform 130 is configured to respond to queries regarding collaboration information. For example, a user may request the collaboration platform 130 to provide a list of the top collaborators for a given user. Alternatively, a user may request the collaboration platform 130 to provide a list of the top projects in which a given user works. In more realistic examples, these requests are made automatically by product applications hosted by product platforms 120 instead of directly by users.

Figure 4:
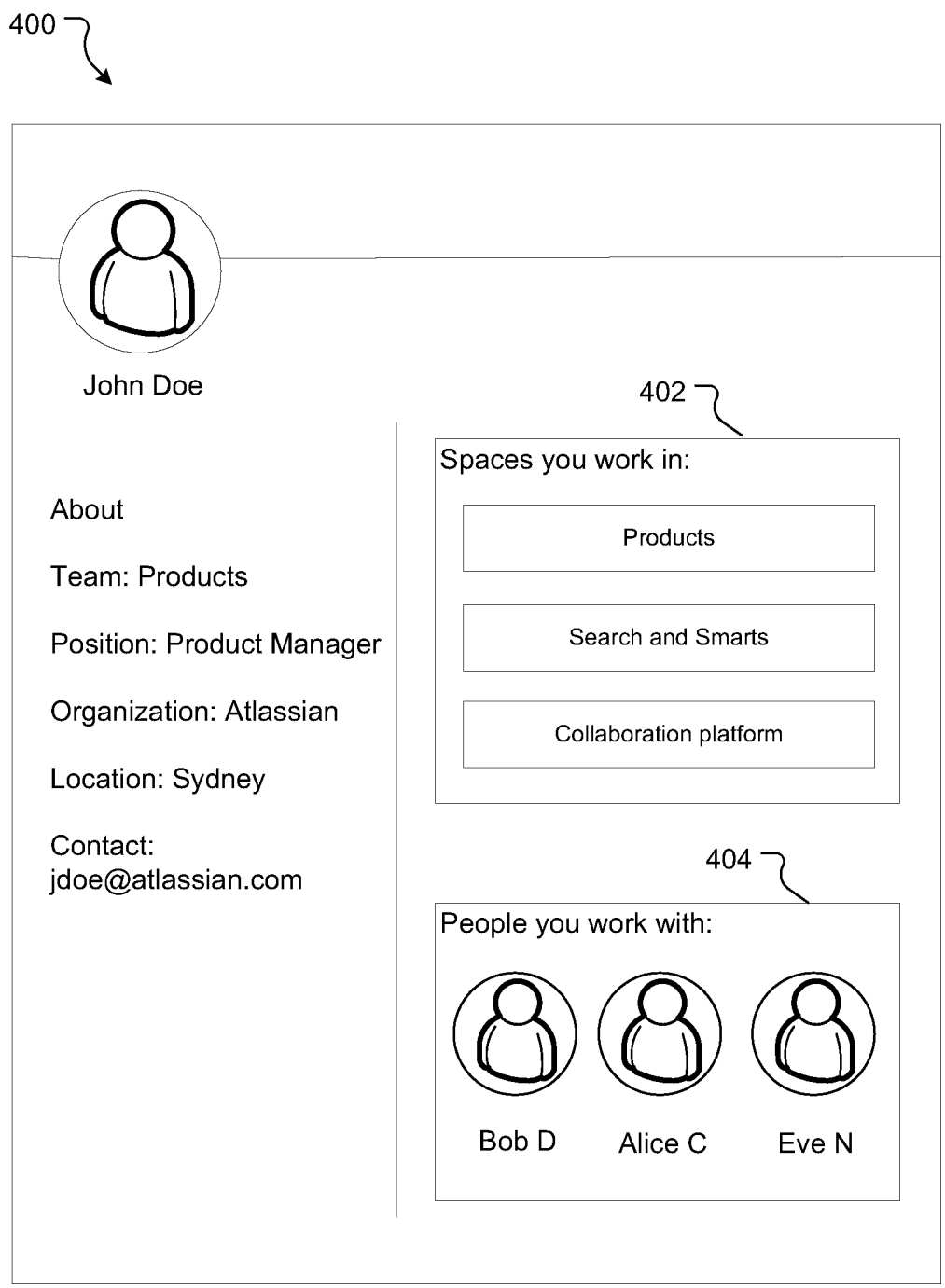
FIG. 4 is a screenshot illustrating an example user profile powered by collaboration information according to some embodiments of the present disclosure.

In one example, a product platform, such as Confluence, may maintain profile pages for employees of an organization and registered users of the Confluence application. This profile page may include personal information about the registered user including e.g., the user's name, position, industry, location, contact details, etc. In addition to this, the profile page may include user specific collaboration information. For example, it may include a section showing the projects in which the user works and another section showing the people the user works with. The information for these sections may be retrieved from the collaboration platform. For instance, when a particular user profile is requested, the Confluence application may send a user-space request (i.e., a request to retrieve the list of spaces a user account is associated with) and user-collaborator request (i.e., a request to retrieve the list of people a user account most frequently works with) to the collaboration platform 130. The collaboration platform may service these requests and return a list of spaces and collaborators for the particular requested user profile. The Confluence application may then render these results in the associated sections. FIG. 4 illustrates an example user profile page 400 showing a space section 402 and a collaborator section 404, which are populated based on requests to the collaboration platform 130.

Figure 5:
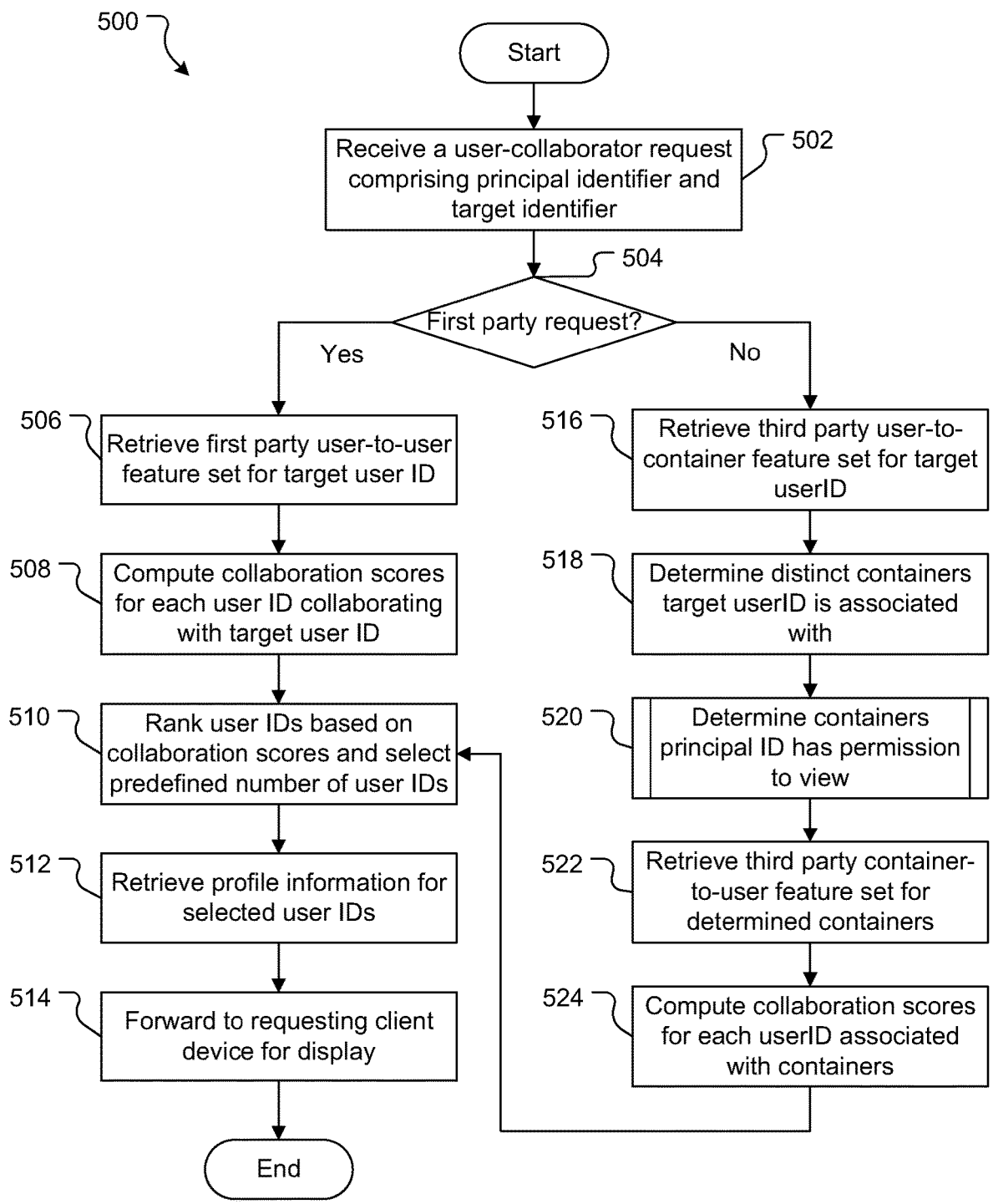
FIG. 5 is a flowchart illustrating a method for responding to a user-collaborator request according to some embodiments of the present disclosure.
Figure 6:
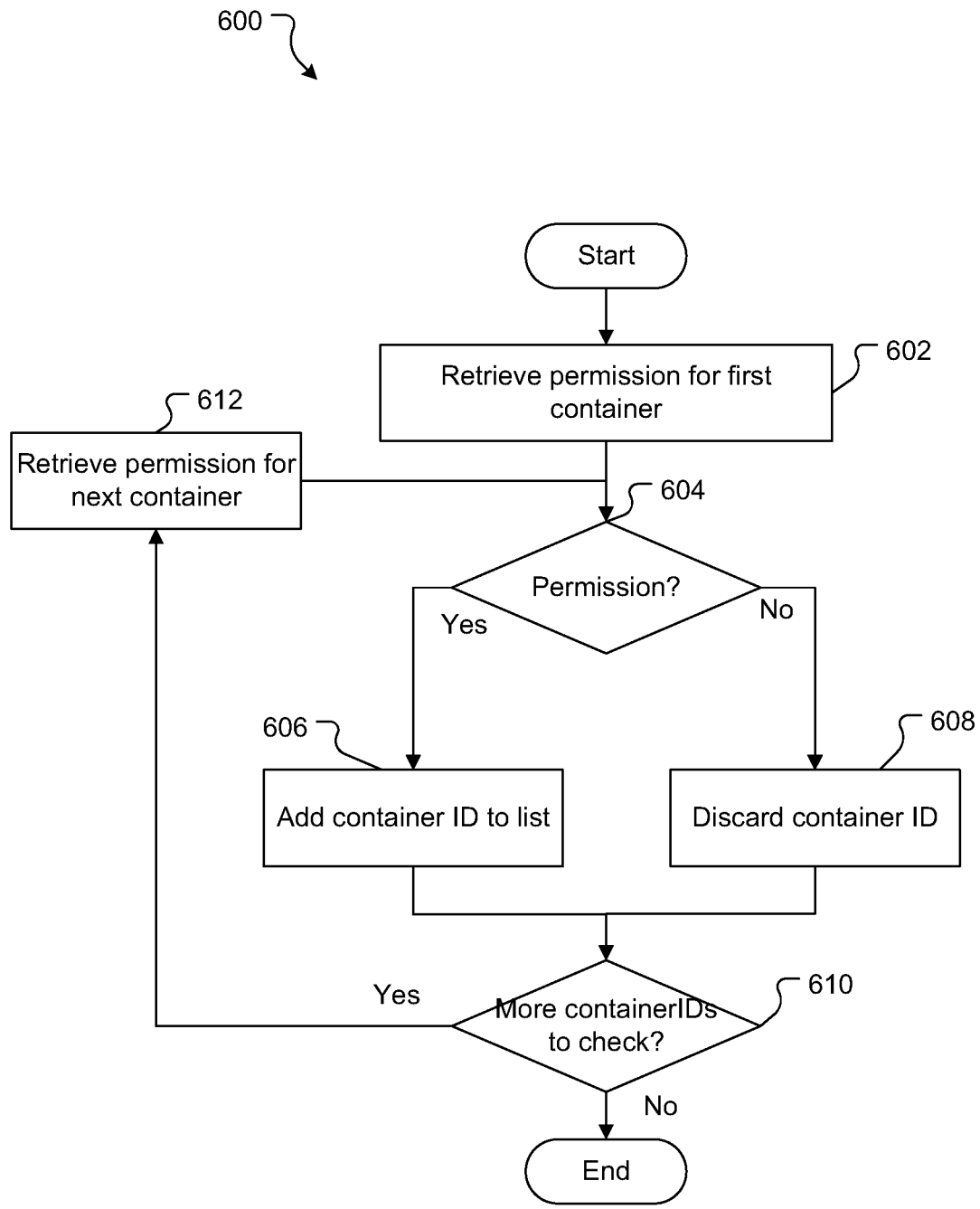
FIG. 6 is a flowchart illustrating a method for determining containers that a requesting user has permission to view according to some embodiments of the present disclosure.
Figure 7:
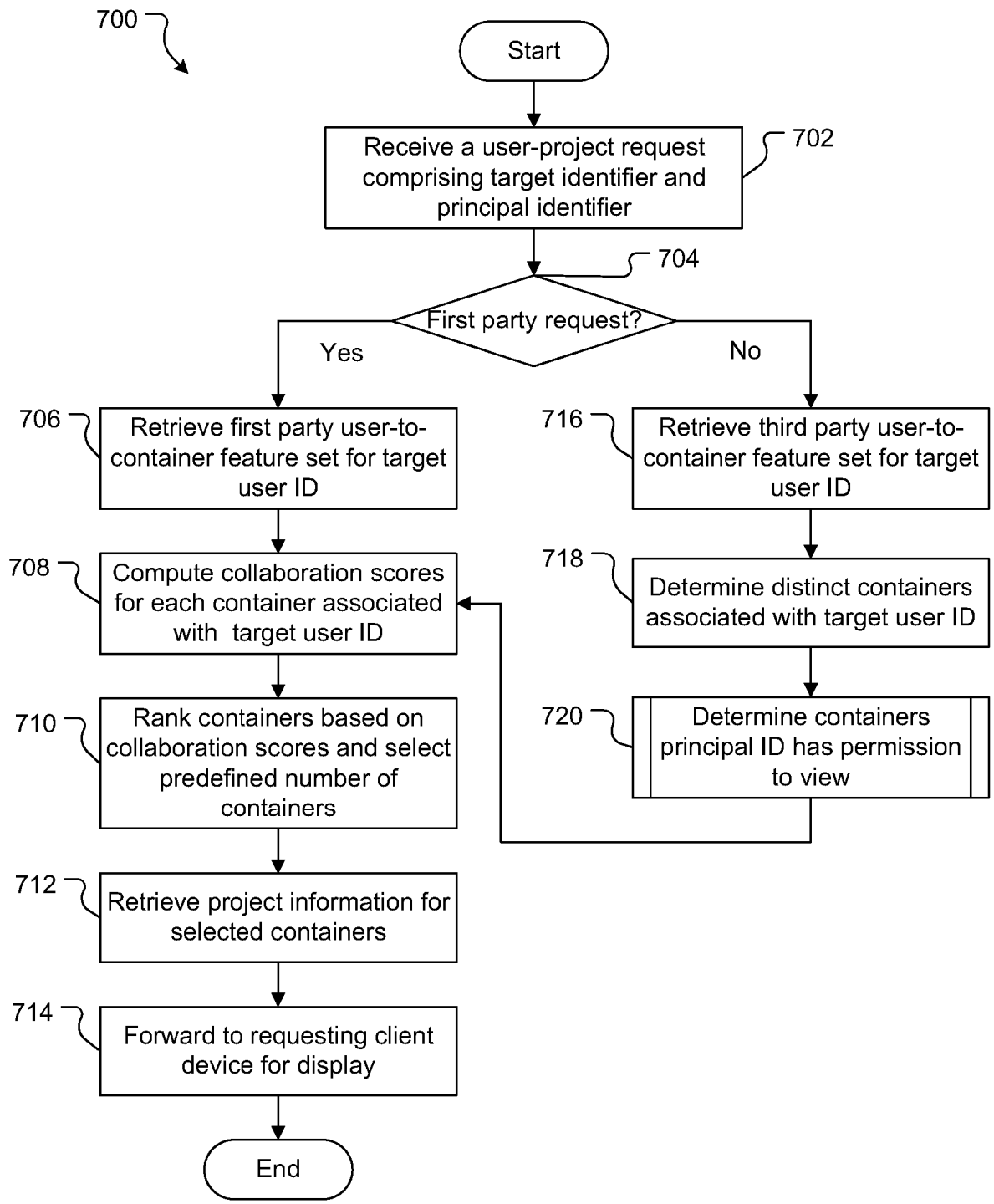
FIG. 7 is a flowchart illustrating a method for responding to a user-container request according to some embodiments of the present disclosure.

FIGS. 5 and 6 illustrate an example method for responding to a user-collaborator request and FIG. 7 illustrates an example method for responding to a user-container request.

FIG. 5 commences at step 502, where the collaboration platform 130 and in particular the API module 136 receives a user-collaborator request (also referred to as a collaborator request herein). The collaborator request has a standard format and includes at least a user identifier of the user making the request (i.e., the principal) and the user identifier of the requested user profile (i.e., the target). In addition, the collaborator request includes the type of information requested—which in this case is a list of collaborators associated with the principal user.

At step 504, the API module 136 forwards the collaborator request to the computation module 139, which determines whether the requestor is the principal or not. In other words, the computation module 139 determines whether the request is a first party request or a third party request. This may be determined, e.g., by comparing the user identifier of the principal with the user identifier of the target user. If the user identifiers match, the computation module 139 can determine that the principal is the target user and that this is a first party request. Alternatively, if the user identifiers do not match, the computation module 139 can determine that the principal user is not the target user and that this is a third party request.

If at step 504, a determination is made that the principal is the target user, the method proceeds to step 506, where the computation module 139 retrieves the first party user-to-user feature counts for the target user. To this end, the computation module 139 may provide the user identifier of the target user to the feature database 138 and request the database 138 to forward the user-to-user feature counts for that particular user.

In one example, the feature database 138 may return the feature values shown in table I below—

TABLE I

| Retrieved first party user-to-user feature set counts | |
| --- | --- |
| Feature name | Users \| Count |
| Product 1 Co-edit frequency 14 days | User A: 20, user B: 15, user C: 2, User D: 1 |
| Product 1 Co-edit frequency 30 days | User A: 40, user B: 25, user C: 12, User D: 1 |
| Product 1 Co-edit frequency 90 days | User A: 90, user B: 45, user C: 22, User D: 1 |
| Product 1 Mention frequency 14 days | User A: 10, User B: 4, User E: 7 |
| Product 1 Mention frequency 30 days | User A: 21, User B: 14, User E: 7, User F: 8 |
| Product 1 Mention frequency 90 days | User A: 21, User B: 14, User E: 7, User F: 30 |
| Product 1 Co-comment frequency 14 days | User A: 10, User C: 2, User H: 1 |
| Product 1 Co-comment frequency 30 days | User A: 20, User B: 4, User C: 5, User H: 1 |
| Product 1 Co-comment frequency 90 days | User A: 29, User B: 7, User C: 5, User H: 1 |
| Product 2 Co-edit frequency 14 days | User A: 20, user B: 15, user C: 2, User D: 1 |
| Product 2 Co-edit frequency 30 days | User A: 40, user B: 25, user C: 12, User D: 1 |
| Product 2 Co-edit frequency 90 days | User A: 90, user B: 45, user C: 22, User D: 1 |
| Product 2 Mention frequency 14 days | User A: 10, User B: 4, User E: 7 |
| Product 2 Mention frequency 30 days | User A: 21, User B: 14, User E: 7, User F: 8 |
| Product 2 Mention frequency 90 days | User A: 21, User B: 14, User E: 7, User F: 30 |
| Product 2 Co-comment frequency 14 days | User A: 10, User C: 2, User H: 1 |

TABLE I-continued

Retrieved first party user-to-user feature set counts

| Feature name | Users | Count |
|---|---|
| Product 2 Co-comment frequency 30 days | User A: 20, User B: 4, User C: 5, User H: 1 |
| Product 2 Co-comment frequency 90 days | User A: 29, User B: 7, User C: 5, User H: 1 |

Although the information is shown in a table, this may not be the case. Instead, the collaborator user identifiers and corresponding counts for the features may be provided in the form of a JSON file.

Once the computation module 139 receives the first party user-to-user feature counts from the feature database 138, the method proceeds to step 508, where the computation module 139 identifies the distinct collaborators the target user interacts with and computes collaboration scorea for the collaborators identified in the retrieved user-to-user feature set count data. In the example shown in Table I, there is collaboration information for 7 distinct collaborators (users A-F and H). Accordingly, in this example, the computation module 139 computes collaboration scores for these 7 distinct collaborators.

In certain embodiments, the collaboration score of a collaborator may be computed by a simple addition of the individual counts over the 90 day period (as this includes the counts for the 30 days and 14 days windows). In this case, the collaboration scores for the seven collaborators may be as shown in table J below—

TABLE J

Example Collaboration Scores

| Collaborator ID | Collaboration Score |
|---|---|
| User A | 280 |
| User B | 132 |
| User C | 54 |
| User D | 2 |
| User E | 14 |
| User F | 60 |
| User H | 2 |

However, such simple addition of the individual counts may not represent an accurate picture. For example, although User F has a higher collaboration score than user C, the type of interaction the target user has had with User C (i.e., co-editing) may be more representative of actual collaboration that the type of interaction the target user has had with User F (i.e., co-commenting). Accordingly, in some embodiments, weights may be applied to the various features to more accurately represent a collaboration score between the target user and his/her co-collaborators. Table K illustrates example weights that may be applied to the features.

TABLE K

Example weights for user-to-user feature set

| Feature | Weight | 14 days | 30 Days | 90 days |
|---|---|---|---|---|
| Co-edit | 1.0 | 0.15 | 0.4 | 0.45 |
| Mention | 0.5 | 0.075 | 0.2 | 0.225 |
| Co-comment | 0.25 | 0.038 | 0.1 | 0.113 |

When these weights are adopted, the collaboration scores for the seven collaborators may be as shown in table L below—

TABLE L

Example collaboration scores

| Collaborator ID | Collaboration Score |
|---|---|
| User A | 149.664 |
| User B | 79.382 |
| User C | 30 |
| User D | 2 |
| User E | 7 |
| User F | 16.7 |
| User H | 0.5 |

As can be seen, these scores represent a more accurate picture of the collaborators. For example, User C now has a higher collaboration score than User F which may be more indicative of the actual collaboration between the target user and Users C and F.

Once the collaboration scores are computed, the computation module 139 may arrange the list of users based on decreasing collaboration scores and select a predefined number of the top collaborators (at step 510). In one example, the predefined number may be a fixed number (e.g., 6) irrespective of the collaboration scores. In another example, the predefined number of top collaborators selected by the computation module 139 at this step may be based on a threshold collaboration score (e.g., 10). Collaborators that have a collaboration score higher than this threshold score may be selected and the remaining collaborators may be discarded.

Next, at step 512, the collaboration platform 130 retrieves user profile information for the selected collaborators. The collaboration platform 130 performs its analysis based on user identifiers. However, a list of user identifiers may not be useful to the requesting entity, as users typically do not remember user identifiers, but user names. Accordingly, at this step, the collaboration platform 130 may submit the list of user identifiers of the collaborators to a system that maintains user profiles for the organization (e.g., an entity management system), and requests the system to return a list of user names and (in some cases), profile pictures of the users corresponding to the user identifiers.

Once the user names and/or profile pictures are retrieved, these are forwarded to the requesting entity at step 514, which causes the information to be displayed in a user interface on a client device (e.g., in the profile user interface 400).

Returning to step 504, if that this step, the computation module 139 determines that the principal user is not the same as the target user (i.e., the request is a third party request), the method proceeds along the no path from this step to step 516, where the computation module 139 retrieves the third party user-to-container feature counts for the target user. In particular, it retrieves a list of containers the target user has interacted with in the past 14 days, 30 days, and 90 days. To this end, the computation module 139 may provide the user identifier of the target user to the feature database 138 and request the database 138 to forward the user-to-container feature counts for that particular user.

In one example, the feature database 138 may return the feature values shown in table M below—

TABLE M

Retrieved Feature counts

| Feature name | Users \| Count |
|---|---|
| Product 1 create frequency 14 days | ContainerA: 2, ContainerB: 5, |
| Product 1 create frequency 30 days | ContainerA: 5, ContainerB: 8, containerC: 3 |
| Product 1 create frequency 90 days | ContainerA: 8, ContainerB: 9, containerC: 3 |
| Product 1 edit frequency 14 days | ContainerA: 9, ContainerB: 5, |
| Product 1 edit frequency 30 days | ContainerA: 15, ContainerB: 18, containerC: 8 |
| Product 1 edit frequency 90 days | ContainerA: 28, ContainerB: 19, containerC: 13 |
| Product 1 comment frequency 14 days | ContainerA: 19, ContainerB: 15, |
| Product 1 comment frequency 30 days | ContainerA: 25, ContainerB: 19, containerC: 8 |
| Product 1 comment frequency 90 days | ContainerA: 40, ContainerB: 29, containerC: 13 |
| Product 2 create frequency 14 days | ContainerD: 2, |
| Product 2 create frequency 30 days | ContainerD: 5, ContainerE: 2 |
| Product 2 create frequency 90 days | ContainerD: 8, ContainerE: 3 |
| Product 2 edit frequency 14 days | ContainerD: 8, |
| Product 2 edit frequency 30 days | ContainerD: 16, ContainerE: 11 |
| Product 2 edit frequency 90 days | ContainerD: 25, ContainerE: 22 |
| Product 2 comment frequency 14 days | ContainerD: 17, |
| Product 2 comment frequency 30 days | ContainerD: 36, ContainerE: 27 |
| Product 2 create frequency 14 days | ContainerD: 45, ContainerE: 39 |

Although the information is shown in a table, this may not be the case. Instead, the container identifiers and corresponding counts for the features may be provided in the form of a JSON file.

Once the computation module 139 receives the user-to-container feature counts from the feature database 138, the method proceeds to step 518, where the computation module 139 determines the distinct containers the user is associated with (e.g., based on the container identifiers. In the example above, the target user has interacted with 5 containers (containers A-E).

Next (at step 520), the collaboration platform 130 determines whether the requestor has permission to view objects in the containers identifier above. To this end, the collaboration platform 130 submits requests to the permissions modules 128 of the product platforms 120 along with the user identifier of the requestor to determine whether the requestor has permission to view these containers. Continuing the example above, the collaboration platform 130 sends one permission request to the permission module 128A 126A of the product platform 120A with identifiers for containers A, B and C and another permission request to the permission module 128B 1268 of the product platform 120B with identifiers for containers D and E. Alternatively, if the network 100 includes a permissions platform, a single request with multiple container identifiers may be sent to the permissions platform.

The collaboration platform 130 retains the containers that the requestor has permission to view and discards the containers that the requestor does not have permission to view. In one example, a sub-process may be performed to make this decision. The sub-process is illustrated in FIG. 6. In particular, the process commences at step 602, where the computation module 139 retrieves the permissions for a first container. At step 604, a determination is made whether the requestor has permission to view this container based on the retrieved permission information. If the requestor is allowed to view this container, the container identifier is added to list (at step 606) and if the requestor is not allowed to view the container, the container identifier is discarded (at step 608). At step 610, a determination is made if more containers exist. If it is determined that more containers are remaining, the method proceeds to step 612 where the computation module 139 retrieves the permissions for the next container. Thereafter the method proceeds to step 604 and the process is repeated until permissions are checked for all the containers for which permissions were sought. Once this is completed, method 600 ends and the computation module 139 has a list of container identifiers that the requestor is permitted to view.

Returning to FIG. 5, once the list of containers the requestor has permission to view is retrieved, the method proceeds to step 522, where for each container in the list, the computation module 139 identifies the users associated with the container. In one embodiment, to do this, the computation module 139 retrieves the container-to-user feature counts for the container identifiers in the list. For instance, if after 520, the computation module 139 determines that the requestor is permitted to view containers A and E, it retrieves the container-to-user feature counts for these containers from the feature database 138.

In one example, the feature database 138 may return the feature values shown in table N below—

TABLE N example container-to-user feature counts

| Feature name | Users \| Count |
|---|---|
| Container A update frequency 14 days | User A: 10, User B: 4, User E: 7 |
| Container A update frequency 30 days | User A: 21, User B: 14, User E: 7, User F: 8 |
| Container A update frequency 90 days | User A: 21, User B: 14, User E: 7, User F: 30 |
| Container A comment frequency 14 days | User A: 20, user B: 15, user C: 2, User D: 1 |
| Container A comment frequency 30 days | User A: 40, user B: 25, user C: 12, User D: 1 |
| Container A comment frequency 90 days | User A: 90, user B: 45, user C: 22, User D: 1 |
| Container E update frequency 14 days | User A: 4, User C: 12, |
| Container E update frequency 30 days | User A: 14, User C: 25, User H: 5 |

TABLE N-continued example container-to-user feature counts

| Feature name | Users | Count |
|---|---|
| Container E update frequency 90 days | User A: 29, User C: 30, User H: 15 |
| Container E comment frequency 14 days | User A: 10, User H: 1 |
| Container E comment frequency 30 days | User A: 20, User B: 4, User C: 5, User H: 1 |
| Container E comment frequency 90 days | User A: 29, User B: 7, User C: 5, User H: 1 |

Once the computation module receives the container-to-user feature counts from the feature database 138, the method proceeds to step 524, where the computation module 139 identifies the distinct users from the container-to-user feature counts and computes collaboration scores for the distinct users identified in the retrieved feature count data. In the example shown in Table N, there is collaboration information for 7 distinct users (users A-F and H). Accordingly, in this example, the computation module 139 computes collaboration scores for these 7 distinct users.

In certain embodiments, the collaboration score of a user may be computed by a simple addition of the individual counts over the 90 day period (as this includes the counts for the 30 days and 14 days windows). Alternatively, weights may be applied to the various features to more accurately represent a collaboration score between the containers and the users. Table O illustrates example weights that may be applied to the features.

TABLE O

Example weights for features

| Feature | Weight | 14 days | 30 Days | 90 days |
|---|---|---|---|---|
| Update | 0.75 | 0.1125 | 0.3 | 0.3375 |
| Comment | 0.5 | 0.075 | 0.2 | 0.225 |

Once the collaboration scores are computed (in the manner similar to that described with respect to step 508) for the seven users, the method proceeds to step 510. Thereafter the method follows the same steps as those followed for first party requests. In this manner, by first retrieving the target user's interactions with containers and then retrieving interactions of users with the containers, the collaboration platform can dynamically identify the list of users that the target user collaborates with (which the requestor is permitted to know about).

FIG. 7 illustrates the method performed when responding to a user-container request. The method commences at step 702, where the collaboration platform 130 and in particular the API module 136 receives a user-container request. The user-container request may also have a standard format and includes at least a user identifier of the user making the request (i.e., the principal) and the user identifier of the requested user profile (i.e., the target). In addition, the user-container request includes the type of information requested—which in this case is a list of containers that the target user is associated with.

At step 704, the API module 136 forwards the user-container request to the computation module 139, which determines whether the principal is the target or not. This step is similar to step 504 of FIG. 5 and therefore not described in detail again.

If at step 704, a determination is made that the principal is the target, the method proceeds to step 706, where the computation module 139 retrieves the first party user-to-container feature counts for the target user. To this end, the computation module 139 may provide the user identifier of the target user to the feature database 138 and request the database 138 to forward the user-to-container feature counts for that particular user.

In one example, the feature database 138 may return the feature values shown in table P below—

TABLE P

Retrieved Feature counts

| Feature name | Container | Count |
|---|---|
| Product 1 create frequency 14 days | ContainerA: 2, ContainerB: 5, |
| Product 1 create frequency 30 days | ContainerA: 5, ContainerB: 8, containerC: 3 |
| Product 1 create frequency 90 days | ContainerA: 8, ContainerB: 9, containerC: 3 |
| Product 1 edit frequency 14 days | ContainerA: 9, ContainerB: 5, |
| Product 1 edit frequency 30 days | ContainerA: 15, ContainerB: 18, containerC: 8 |
| Product 1 edit frequency 90 days | ContainerA: 28, ContainerB: 19, containerC: 13 |
| Product 1 comment frequency 14 days | ContainerA: 19, ContainerB: 15, |
| Product 1 comment frequency 30 days | ContainerA: 25, ContainerB: 19, containerC: 8 |
| Product 1 comment frequency 90 days | ContainerA: 40, ContainerB: 29, containerC: 13 |
| Product 2 create frequency 14 days | ContainerD: 2, |
| Product 2 create frequency 30 days | ContainerD: 5, ContainerE: 2 |
| Product 2 create frequency 90 days | ContainerD: 8, ContainerE: 3 |
| Product 2 edit frequency 14 days | ContainerD: 8, |
| Product 2 edit frequency 30 days | ContainerD: 16, ContainerE: 11 |
| Product 2 edit frequency 90 days | ContainerD: 25, ContainerE: 22 |
| Product 2 comment frequency 14 days | ContainerD: 17, |
| Product 2 comment frequency 30 days | ContainerD: 36, ContainerE: 27 |
| Product 2 create frequency 14 days | ContainerD: 45, ContainerE: 39 |

Although the information is shown in a table, this may not be the case. Instead, the collaborator user identifiers and corresponding counts for the features may be provided in the form of a JSON file.

Once the computation module receives the user-to-container feature counts from the feature database 138, the method proceeds to step 708, where the computation module 139 identifies the distinct containers associated with the target user and computes a collaboration score for each of the containers identified in the retrieved feature count data. In the example shown in Table P, there is collaboration information for 5 distinct containers (containers A-E). Accordingly, in this example, the computation module 139 computes collaboration scores for these 7 distinct containers.

In certain embodiments, the collaboration score of a container may be computed by a simple addition of the individual counts over the 90 day period (as this includes the counts for the 30 days and 14 days windows). Alternatively, weights may be applied to the various features to more accurately represent a collaboration score between the target user and the containers the user interacts with. Table Q illustrates example weights that may be applied to the features.

TABLE Q

Example weights for features

| Feature | Weight | 14 days | 30 Days | 90 days |
|---|---|---|---|---|
| Create | 1.0 | 0.15 | 0.4 | 0.45 |
| Edit | 0.5 | 0.075 | 0.2 | 0.225 |
| Comment | 0.25 | 0.038 | 0.1 | 0.113 |

When these weights are adopted, the collaboration scores for the 5 containers may be as shown in table R below—

TABLE R

Example collaboration scores

| Collaborator ID | Collaboration Score |
|---|---|
| Container A | 23.6 |
| Container B | 21.5 |
| Container C | 9.344 |

TABLE R-continued

Example collaboration scores

| Collaborator ID | Collaboration Score |
|---|---|
| Container D | 24.656 |
| Container E | 16.4 |

Once the collaboration scores are computed in this manner, the computation module 139 may arrange the list of containers based on decreasing collaboration scores and select a predefined number of the top containers (at step 710). In one example, the predefined number may be a fixed number (e.g., 4) irrespective of the collaboration scores. In another example, the predefined number of top containers selected by the computation module 139 at this step may be based on a threshold collaboration score (e.g., 10). Containers that have a collaboration score higher than this threshold score may be selected and the remaining containers may be discarded.

Next, at step 712, the collaboration platform 130 retrieves project/space names for the selected containers. The collaboration platform 130 performs its analysis based on container identifiers. However, a list of container identifiers may not be useful to the requesting entity, as users typically do not remember container identifiers, but project/space names. Accordingly, at this step, the collaboration platform 130 may submit the list of container identifiers to the product platforms to retrieve a list of names of the projects and/or spaces corresponding to the container identifiers.

Once the container names are retrieved, these are forwarded to the requesting entity at step 714, which causes the information to be displayed in a user interface on a client device (e.g., in the profile user interface 400).

Returning to step 704, if that this step, the computation module 139 determines that the requestor is not the same as the target user (i.e., the request is a third party request), the method proceeds along the no path from this step to step 716, where the computation module 139 retrieves the third party user-to-container feature counts for the target user. In particular, it retrieves a list of containers the target user has interacted with in the past 14 days, 30 days, and 90 days. To this end, the computation module 139 may provide the user identifier of the target user to the feature database 138 and request the database 138 to forward the third party user-to-container feature counts for that particular user.

In one example, the feature database 138 may return the feature values shown in table M below—

TABLE M

Retrieved Feature counts

| Feature name | Users 1 Count |
|---|---|
| Product 1 create frequency 14 days | ContainerA: 2, |
| Product 1 create frequency 30 days | ContainerA: 5, ContainerC: 3 |
| Product 1 create frequency 90 days | ContainerA: 8, ContainerC: 3 |
| Product 1 edit frequency 14 days | ContainerA: 9, |
| Product 1 edit frequency 30 days | ContainerA: 15, ContainerC: 8 |
| Product 1 edit frequency 90 days | ContainerA: 28, ContainerC: 13 |
| Product 1 comment frequency 14 days | ContainerA: 19, ContainerB: 1, |
| Product 1 comment frequency 30 days | ContainerA: 25, ContainerB: 5, ContainerC: 8 |
| Product 1 comment frequency 90 days | ContainerA: 40, ContainerB: 9, ContainerC: 13 |
| Product 2 create frequency 14 days | ContainerD: 2, |
| Product 2 create frequency 30 days | ContainerD: 5, ContainerE: 2 |
| Product 2 create frequency 90 days | ContainerD: 8, ContainerE: 3 |
| Product 2 edit frequency 14 days | ContainerD: 8, |
| Product 2 edit frequency 30 days | ContainerD: 16, ContainerE: 11 |
| Product 2 edit frequency 90 days | ContainerD: 25, ContainerE: 22 |

TABLE M-continued

Retrieved Feature counts

| Feature name | Users 1 Count |
| --- | --- |
| Product 2 comment frequency 14 days | ContainerD: 17, |
| Product 2 comment frequency 30 days | ContainerD: 36, ContainerE: 27 |
| Product 2 create frequency 14 days | ContainerD: 45, ContainerE: 39 |

In this example, the target user had interacted with container B multiple times while working on a secret object. In this case, the interaction counts corresponding to those interactions are not part of the feature counts in the third party version of the user-to-container features.

Further, although the information is shown in a table, this may not be the case. Instead, the container identifiers and corresponding counts for the features may be provided in the form of a JSON file.

Once the computation module 139 receives the third party user-to-container feature counts from the feature database 138, the method proceeds to step 718, where the computation module 139 determines the distinct containers the user is associated with (e.g., based on the container identifiers. In the example above, the target user has interacted with 5 containers (containers A-E).

Next (at step 720), the collaboration platform 130 identifies the containers that the principal user has permission to view from the list of distinct containers. It retains the containers that the principal user has permission to view and discards the containers that the principal user does not have permission to view. This is similar to step 520 of FIG. 5 and therefore not described in detail here again.

Once the list of permitted containers is identified, the method proceeds to step 708, where for each container in the list, the computation module 139 computes a collaboration score. It will be appreciated that in the case of the third party request, the collaboration values may be different to those calculated in the first party request as the requesting user may not have access to all the containers/objects associated with the target user.

Methods 500-700 describe methods for responding to user-container requests and user-collaborator requests. In other embodiments, a requestor (i.e., a user or a product platform 120) may request collaboration information about a container (e.g., a space or a project). For example, a product platform, such as Jira, may maintain a landing page for the projects undertaken by an organization and maintained by the Jira application. This landing page includes information about the project including e.g., the project title, the status of the project—active or inactive, a brief description about the project, etc. In addition to this, the landing page may include project specific collaboration information. For example, it may include a section showing a list of team members for that project. The information for this section may be retrieved from the collaboration platform 130. For instance, when a user requests a particular landing page, the Jira application may send a project-user request (i.e., a request to retrieve the list of users working on that project) to the collaboration platform 130. The collaboration platform 130 may service this request and return a list of users that work on that project. The Jira application may then render these results in the associated section. FIG. 8 illustrates an example project landing page 800 showing a team section 802, which is populated based on the project-user request to the collaboration platform 130.

Figure 9:
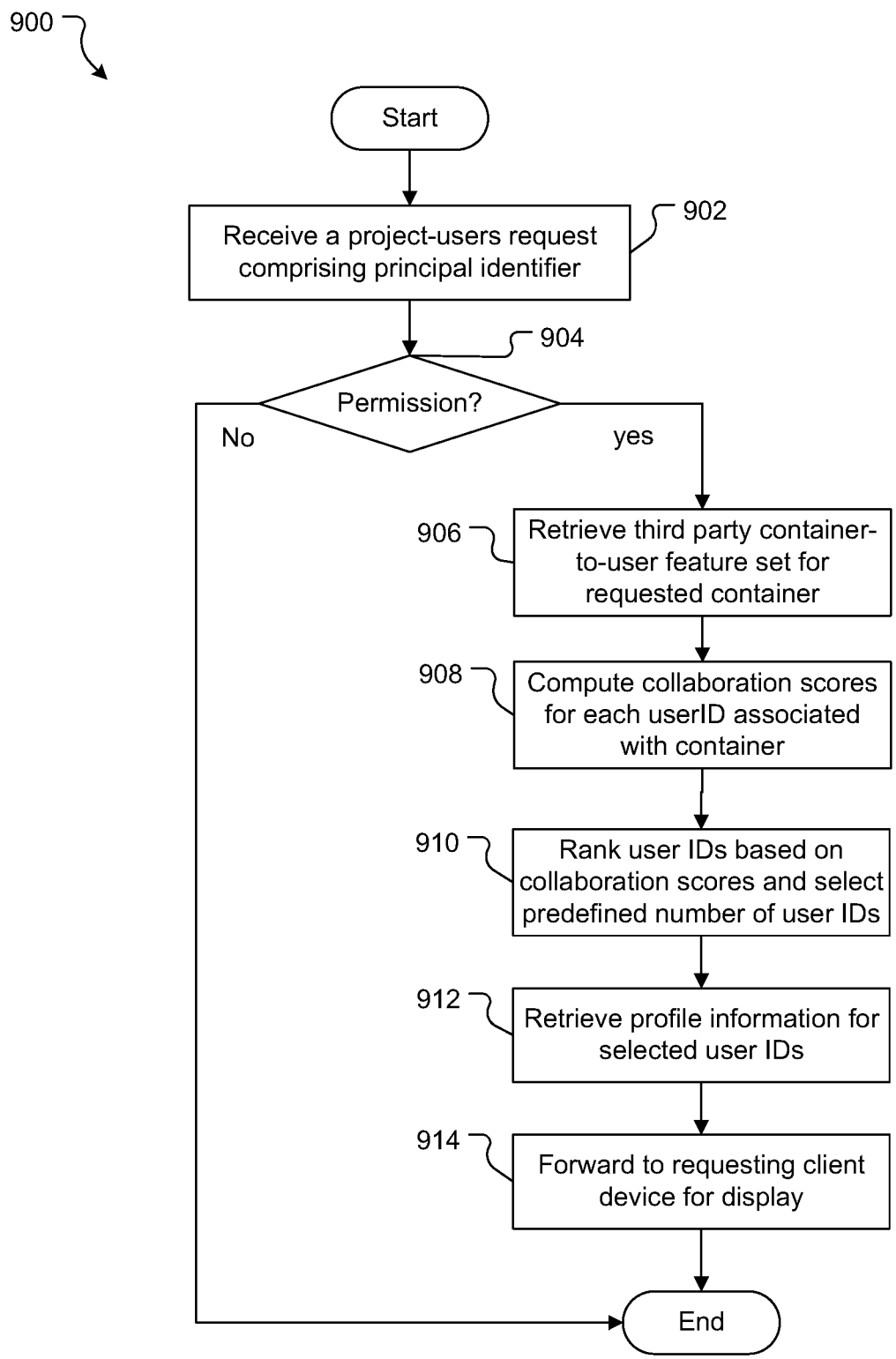
FIG. 9 is a flowchart illustrating a method for responding to a container-user request according to some embodiments of the present disclosure.

FIG. 9 illustrates an example process for accomplishing this. FIG. 9 commences at step 902, where the collaboration platform 130 and in particular the API module 136 receives a container-user request. The container-user request has a standard format and includes at least a user identifier of the user making the request (i.e., the requestor) and the container identifier of the requested container (i.e., the project). In addition, the collaborator request includes the type of information requested—which in this case is a list of collaborators associated with the requested container.

Next (at step 904), the collaboration platform 130 determines whether the requestor has permission to view objects in the requested container. To this end, the collaboration platform 130 submits a request to the permissions modules 128 of the product platform 120 associated with the requested container along with the user identifier of the requestor to determine whether the requestor has permission to view the requested container. Continuing the example above, the collaboration platform 130 sends one permission request to the permission module 128A of the product platform 120A or to the permission module 128B of the product platform 120B with identifiers for the requested container and requestor depending on the platform of the requested container. etc. Alternatively, if the network 100 includes a permissions platform, a single request with the container identifier may be sent to the permissions platform.

If the requestor does not have permission to view objects in the requested container, method 900 ends. Alternatively, if the requestor have permission to view objects in the requested container, the method proceeds to step 906 where the computation module 139 retrieves third party container-to-user features for the requested container identifier from the feature database 138.

The method 900 then proceeds to step 908, where the computation module 139 computes a collaboration score for the users identified in the retrieved third party container-to-user feature data for the requested container identifier. For example, if there is collaboration information for 7 distinct users, the computation module 139 computes collaboration scores for these 7 distinct users.

The collaboration scores are computed in a similar manner to that described above with respect to FIG. 5 above.

Once the collaboration scores are computed for the seven users, the method proceeds to step 910 where the computation module 139 ranks the user ID associated with the container identifier based on the collaboration scores and selects a predefine number of user identifiers.

Thereafter the method follows steps (912-914) similar to steps 512-514 described above.

The preceding sections describe some example methods for retrieving intelligent collaboration information from the collaboration platform 130 for example to provide a list of collaborators that work with a particular user, provide a list of containers that a particular user interacts with, or provide a list of users that work in a particular container. In the illustrated examples, this information is displayed on informational profile/landing pages.

It will be appreciated that the collaboration platform 130 can be used as an add-in for a number of other services and functions to provide smart inferential data to improve those services and functions.

For instance, in one example, the collaboration platform 130 can be integrated with a search user interface to power intelligent filter options based on the collaboration features. FIG. 10 illustrates an example search user interface 1000 that includes smart search filters provided by the collaboration platform 130. In this example, the user interface 1000 include a container section 1002 that includes a list of spaces in which the user performing the search works and a contributors section 1004 that includes a list of collaborators the person performing the search works with. The user could then select one or more of the spaces and/or people to restrict the search results such that they relate to the selected spaces and/or selected contributors. To populate the container and contributors sections the search interface provides a user-collaborator request and a user-container request to the collaboration platform and the collaboration platform 130 performs the methods of FIGS. 5-7 to provide the results. It will be appreciated that in this case, as the results are provided for the user performing the search, the principal is the target user and therefore the collaboration platform 130 does not perform method steps 504 or 704. Instead, it directly performs the method steps 506-514 or 706-714 upon receiving the corresponding request. Further, for this implementation, the collaboration platform 130 need not maintain separate collaboration feature sets for third party user—as these types of requests are not received in this implementation.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. All of these different combinations constitute various alternative aspects of the embodiments.

What is claimed is:

1. A computer-implemented method of tracking user activity using a networked collaboration platform, the computer-implemented method comprising:
   receiving a search query from a client device;
   retrieving search results based on the search query;
   causing the client device to display at least a portion of the search results in a search-result region of a search user interface rendered on the client device, the displayed portion of the search results including a set of object identifiers, wherein each respective object identifier of the set of object identifiers identifies a respective content item of the networked collaboration platform;
   determining a user identifier of a first user associated with the client device;
   obtaining a user event log from the networked collaboration platform, the user event log including a list of time-indexed event records generated in response to user interactions with the networked collaboration platform;
   converting the user event log into a user-to-user feature set representative of interactions in the networked collaboration platform between the first user and respective second users of a set of second users, the user-to-user feature set comprising a data object formatted in a computer readable data interchange format and comprising:
      an identifier of a second user of the set of second users; and
      a count value indicating a number of instances in which the first user and the second user modified a same content item in the networked collaboration platform;
   computing a respective collaboration score for each respective second user of the set of second users based on the user-to-user feature set;
   ranking user identifiers associated with the set of second users based on the collaboration scores and selecting one or more of the ranked user identifiers based at least in part on the ranking;
   causing a set of graphical objects to be displayed on the client device in a filter picker region of the search user interface, each respective graphical object corresponding to a respective one of the selected one or more ranked user identifiers; and
   in response to detecting a user interaction with a particular graphical object for a particular user identifier, the interaction indicative of a selection of the particular graphical object:
      filtering the retrieved search results based on the particular user identifier to produce a set of filtered search results; and
      causing the portion of the search results displayed in the search-result region of the search user interface to be replaced with at least a portion of the set of filtered search results.

2. The computer-implemented method of claim 1, further comprising retrieving profile information for the selected one or more ranked user identifiers.

3. The computer-implemented method of claim 1, wherein:
   the set of filtered search results is a first set of filtered search results; and
   the method further comprises:
      converting the user event log into a user-to-container feature set representative of interactions in the networked collaboration platform between the first user and respective containers of a set of containers, the user-to-container feature set comprising an additional data object formatted in the computer readable data interchange format and comprising:

an identifier of a container of the set of containers; and a count value indicating a number of instances in which the first user modified a content item in the container of the set of containers in the networked collaboration platform;

computing a respective container collaboration score for each respective container of the set of containers based on the user-to-container feature set;

ranking container identifiers associated with the set of containers based on the container collaboration scores and selecting one or more of the container identifiers based at least in part on the ranking;

causing a set of additional graphical objects to be displayed on the client device for display in the filter picker region of the search user interface, each respective additional graphical object corresponding to a respective one of the selected one or more container identifiers; and in response to detecting a user interaction with a particular graphical object for a particular container identifier, the interaction indicative of a selection of the particular graphical object:

filtering the retrieved search results based on the particular container identifier to produce a second set of filtered search results; and causing the portion of the search results displayed in the search-result region of the search user interface to be replaced with at least a portion of the second set of filtered search results.

4. The computer-implemented method of claim 3, wherein at least one of the containers of the set of containers includes a document of a collaborative document system.

5. The computer-implemented method of claim 3, wherein at least one of the containers of the set of containers includes an issue of an issue tracking system.

6. The computer-implemented method of claim 1, wherein filtering the search results causes search results that are not associated with the selected user identifier to be omitted from the displayed search results.

7. The computer-implemented method of claim 1, wherein the search results include:

a first search result relating to a document of a collaborative document system; and a second search result relating to a container of a collaborative document system.

8. The computer-implemented method of claim 1, wherein the count value indicating the number of instances in which the first user and the second user modified the same content item in the networked collaboration platform is a count value indicating the number of instances in which the first user and the second user modified the same content item in the networked collaboration platform within a first time period.

9. The computer-implemented method of claim 1, wherein:

the data object is a first data object; and the user-to-user feature set further comprises a second data object formatted in the computer readable data interchange format and comprising an additional count value indicating a number of instances in which the first user and the second user modified the same content item in the networked collaboration platform within a second time period different from the first time period.

10. A computer-implemented method comprising:

receiving a search query from a client device;

obtaining search results based on the search query;

causing the client device to display at least a portion of the search results in a search-result region of a search user interface rendered on the client device, the displayed portion of the search results including a set of object identifiers, wherein each respective object identifier of the set of object identifiers identifies a respective content item of a networked collaboration platform;

determining a user identifier of a user associated with the client device;

obtaining a user event log from the networked collaboration platform, the user event log including a list of time-indexed event records generated in response to user interactions with the networked collaboration platform;

converting the user event log into a user-to-container feature set representative of interactions in the networked collaboration platform between the user and respective containers of a set of containers, the user-to-container feature set comprising a data object formatted in a computer readable data interchange format and comprising:

an identifier of a container of the set of containers; and a count value indicating a number of instances in which the user modified a content item in the container of the set of containers in the networked collaboration platform;

computing a respective collaboration score for each respective container of the set of containers based on the user-to-container feature set;

ranking container identifiers associated with the set of containers based on the collaboration scores and selecting one or more of the container identifiers based at least in part on the ranking;

causing a set of graphical objects to be displayed on the client device in a filter picker region of the search user interface, each respective graphical object corresponding to a respective one of the selected one or more container identifiers; and in response to detecting a user interaction with a particular graphical object for a particular container identifier, the interaction indicative of a selection of the particular graphical object:

filtering the retrieved search results based on the particular container identifier to produce a set of filtered search results; and causing the portion of the search results displayed in the search-result region of the search user interface to be replaced with at least a portion of the set of filtered search results.

11. The computer-implemented method of claim 10, further comprising retrieving container information for the selected container one or more identifiers.

12. The computer-implemented method of claim 10, wherein:

the user is a first user;

the data object is a first data object;

the set of filtered search results is a first set of filtered search results; and the method further comprises:

converting the user event log into a user-to-user feature set representative of interactions in the networked collaboration platform between the first user and respective second users of a set of second users, the user-to-user feature set comprising a second data object formatted in the computer readable data interchange format and comprising:
- an identifier of a second user of the set of second users; and
- a count value indicating a number of instances in which the first user and the second user modified a same content item in the networked collaboration platform;

computing a respective user collaboration score for each respective second user of the set of second users based on the user-to-user feature set;

ranking user identifiers associated with the set of second users based on the user collaboration scores and selecting one or more of the ranked user identifiers based at least in part on the ranking;

causing a set of additional graphical objects to be displayed on the client device in the filter picker region of the search user interface, each respective additional graphical object corresponding to a respective one of the selected one or more ranked user identifiers; and in response to detecting a user interaction with a particular additional graphical object for a particular user identifier, the interaction indicative of a selection of the particular additional graphical object:
- filtering the retrieved search results based on the particular user identifier to produce a second set of filtered search results; and
- causing the portion of the search results displayed in the search-result region of the search user interface to be replaced with at least a portion of the second set of filtered search results.

13. The computer-implemented method of claim 10, wherein at least one of the containers includes a document of a collaborative document system.

14. The computer-implemented method of claim 10, wherein at least one of the containers includes an issue of an issue tracking system.

15. The computer-implemented method of claim 10, wherein filtering the search results causes search results that are not associated with the particular container identifier to be omitted from the displayed search results.

16. The computer-implemented method of claim 10, wherein the search results include:
- a first search result relating to a document of a collaborative document system; and
- a second search result relating to a particular container of a collaborative document system.

17. A client computer system comprising:
- a display;
- one or more processors; and
- one or more non-transitory computer-readable storage media storing sequences of instructions which, when executed by the one or more processors, cause the one or more processors to:
    - display, on the display, a search query user interface;
    - receive a search query in the search user interface;
    - send the search query and a first user identifier associated with a user of the client computer system to a service of a collaboration platform;
    - receive search results based on the search query from the service of the collaboration platform;
    - display at least a portion of the search results in a search result region of the search user interface;
    - receive a set of graphical objects, each respective graphical object corresponding to a respective user identifier of a set of selected user identifiers, the selected user identifiers selected by:
        - obtaining a user event log from the networked collaboration platform, the user event log including a list of time-indexed event records generated in response to user interactions with the networked collaboration platform;
        - converting the user event log into a user-to-user feature set representative of interactions in the networked collaboration platform between a first user of the client computer system and respective second users of a set of second users, the user-to-user feature set comprising a data object formatted in a computer readable data interchange format and comprising:
            - an identifier of a second user of the set of second users; and
            - a count value indicating a number of instances in which the first user and the second user modified a same content item in the networked collaboration platform;
        - computing a respective collaboration score for each respective second user of the set of second users based on the user-to-user feature set;
        - ranking user identifiers associated with the set of second users based on the collaboration scores and selecting one or more of the ranked user identifiers based at least in part on the ranking; and
        - selecting the set of graphical objects, each respective graphical object of the set of graphical objects corresponding to a respective one of the selected one or more ranked user identifiers
    - display at least a subset of the set of graphical objects in a filter picker region of the search user interface;
    - in response to detecting a user interaction with a particular graphical object for a particular user identifier, the interaction indicative of a selection of the particular graphical object:
        - causing the displayed search results to be filtered based on the particular user identifier, thereby producing a set of filtered search results; and
        - replacing the displayed portion of the search results with at least a portion of the set of filtered search results.

* * * * *